US 9,608,836 B2

United States Patent
Yang et al.

(10) Patent No.: US 9,608,836 B2
(45) Date of Patent: Mar. 28, 2017

(54) CONTROL DEVICE, CONTROL TARGET DEVICE AND METHOD OF TRANSMITTING CONTENT INFORMATION THEREOF

(71) Applicants: Seungryul Yang, Seoul (KR); Hyeoncheol Cho, Seoul (KR); Youngwook Kang, Seoul (KR); Yoonsik Uhm, Seoul (KR); Jongyeop Lee, Seoul (KR); Chanhun Jeon, Seoul (KR); Beomjin Jeon, Seoul (KR); Jeonghwan Yoon, Seoul (KR)

(72) Inventors: Seungryul Yang, Seoul (KR); Hyeoncheol Cho, Seoul (KR); Youngwook Kang, Seoul (KR); Yoonsik Uhm, Seoul (KR); Jongyeop Lee, Seoul (KR); Chanhun Jeon, Seoul (KR); Beomjin Jeon, Seoul (KR); Jeonghwan Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 350 days.

(21) Appl. No.: 13/675,644

(22) Filed: Nov. 13, 2012

(65) Prior Publication Data
US 2013/0124692 A1    May 16, 2013

Related U.S. Application Data

(60) Provisional application No. 61/559,119, filed on Nov. 13, 2011, provisional application No. 61/661,312,
(Continued)

(51) Int. Cl.
*H04L 12/28*    (2006.01)
*H04N 21/436*    (2011.01)
(Continued)

(52) U.S. Cl.
CPC .... *H04L 12/2812* (2013.01); *H04N 21/43615* (2013.01); *H04N 21/44227* (2013.01); *H04N 21/47202* (2013.01); *H04N 21/482* (2013.01)

(58) Field of Classification Search
CPC .............. H04N 21/00–21/64784; G06F 17/30–17/30696; G06Q 10/00–10/30; G06Q 30/00–30/0284; H04L 7/00–67/28
(Continued)

(56) References Cited

U.S. PATENT DOCUMENTS

2002/0107830 A1*  8/2002  Nanja ............................. 707/1
2003/0065805 A1*  4/2003  Barnes, Jr. ............ G06Q 10/02
                                                            709/231
(Continued)

FOREIGN PATENT DOCUMENTS

KR    10-2005-0062849 A    6/2005
KR    10-2006-0100002 A    9/2006
(Continued)

*Primary Examiner* — Nicholas Taylor
*Assistant Examiner* — Clayton R Williams
(74) *Attorney, Agent, or Firm* — Dentons US LLP

(57) ABSTRACT

Provided are control device and a method of controlling a server. The method includes requesting an aggregated device list to the aggregate server; receiving the aggregated device list from the aggregate server; selecting at least one aggregated device from the received aggregated device list; requesting, to the aggregate server, content information collected from the selected aggregated device; and receiving, from the aggregate server, the content information of the selected aggregated device transmitted.

4 Claims, 29 Drawing Sheets

Related U.S. Application Data filed on Jun. 18, 2012, provisional application No. 61/670,109, filed on Jul. 10, 2012.

(51) Int. Cl.
*H04N 21/442* (2011.01)
*H04N 21/472* (2011.01)
*H04N 21/482* (2011.01)

(58) Field of Classification Search
USPC .......................................................... 709/219
See application file for complete search history.

(56) References Cited

U.S. PATENT DOCUMENTS

| | | | |
|---|---|---|---|
| 2004/0088731 A1* | 5/2004 | Putterman et al. | 725/94 |
| 2005/0265330 A1* | 12/2005 | Suzuki et al. | 370/389 |
| 2006/0161511 A1* | 7/2006 | Berstis et al. | 707/1 |
| 2007/0282848 A1* | 12/2007 | Kiilerich | G06F 17/30053 |
| 2008/0189440 A1* | 8/2008 | Goyal | H04L 67/1095 |
| | | | 709/248 |
| 2009/0006582 A1* | 1/2009 | Daswani et al. | 709/219 |
| 2009/0077263 A1* | 3/2009 | Koganti et al. | 709/248 |
| 2009/0203403 A1* | 8/2009 | Gidron | H04L 12/5895 |
| | | | 455/557 |
| 2009/0265417 A1* | 10/2009 | Svendsen et al. | 709/203 |
| 2010/0070490 A1* | 3/2010 | Amidon et al. | 707/722 |
| 2010/0114979 A1* | 5/2010 | Petersen | 707/803 |
| 2010/0169279 A1* | 7/2010 | Loi et al. | 707/640 |
| 2013/0024634 A1* | 1/2013 | Shitomi | G06F 3/061 |
| | | | 711/162 |

FOREIGN PATENT DOCUMENTS

| | | |
|---|---|---|
| KR | 10-2010-0056898 A | 5/2010 |
| KR | 10-2011-0032674 A | 3/2011 |

* cited by examiner

FIG.10

| Device properties | Total Storage Size | Free Storage Size | Memory | CPU | XML Parsing Capability | Transforming Capability | Connectivity &Transfer Protocols | The number of Stored Content | Device Type | Aggregation Mode |
|---|---|---|---|---|---|---|---|---|---|---|
| ACMS #1 | 1GB | 500MB | 1.5GB | 3.5 GHz | Grade 3 | 32 | Grade 1 | 77 | Grade 2 | Off |
| ACMS #2 | 500MB | 100MB | 2GB | 2.53 GHz | Grade 1 | 13 | Grade 2 | 204 | Grade 4 | On |
| ACMS #3 | 100MB | 20MB | 1GB | 1 GHz | Grade 3 | 0 | Grade 1 | 564 | Grade 1 | Off |

| Device properties | Total Storage Size | Free Storage Size | Memory | CPU | XML Parsing Capability | Transforming Capability | Connectivity &Transfer Protocols | The number of Stored Content | Device Type | Aggregation Mode | Sum | Overall Rank |
|---|---|---|---|---|---|---|---|---|---|---|---|---|
| ACMS #1 | 1 | 1 | 2 | 1 | 2 | 1 | 1 | 3 | 2 | 2 | 16 | 1 |
| ACMS #2 | 2 | 2 | 1 | 2 | 1 | 2 | 3 | 2 | 3 | 1 | 19 | 2 |
| ACMS #3 | 3 | 3 | 3 | 3 | 3 | 3 | 1 | 1 | 1 | 2 | 23 | 3 |

| Device properties | Aggregation Capability |
|---|---|
| ACMS #1 | Grade 1 |
| ACMS #2 | Grade 3 |
| ACMS #3 | Grade 4 |

FIG.19

| Property (Metadata type) | ObjectID | aggregatedObjectID | originalServerUDN | title | creator | ... |
|---|---|---|---|---|---|---|
| Aggregate Object on AMS | 11 | 1 | aab3 | episode01 | Torres | ... |
| | 12 | 2 | aab3 | episode02 | Messi | ... |
| | 13 | 3 | aab3 | episode03 | Ronaldo | ... |
| | 14 | 4 | aab3 | episode04 | Park | ... |
| | 15 | 5 | aab3 | episode05 | Ki | ... |
| | 16 | 6 | 78wq | episode06 | Unknown | ... |
| | 17 | 7 | aab3 | episode07 | Beckham | ... |
| | 18 | 8 | 78wq | episode08 | Rooney | ... |

FIG.20

| Property (Metadata type) | ObjectID | aggregatedObjectID | originalServerUDN | title | creator | ... |
|---|---|---|---|---|---|---|
| Aggregate Object on AMS | 11 | 1 | aab3 | pilot | Torres | ... |
| | 12 | 2 | aab3 | episode02 | Messi | ... |
| | 13 | 3 | aab3 | episode03 | Ronaldo | ... |
| | 14 | 4 | aab3 | episode04 | Park | ... |
| | 15 | 5 | aab3 | episode05 | Ki | ... |
| | 16 | 6 | 78wq | episode06 | Xavi | ... |
| | 17 | 7 | aab3 | episode07 | Beckham | ... |
| | 18 | 8 | 78wq | finale | Rooney | ... |

FIG.21

| Property (Metadata type) | ObjectID | aggregatedObjectID | originalServerUDN | title | creator | ... |
|---|---|---|---|---|---|---|
| Aggregate Object on AMS | 11 | 1 | aab3 | pilot | Torres | ... |
| | | | deleted | | | ... |
| | 13 | 3 | aab3 | episode03 | Ronaldo | ... |
| | | | deleted | | | |
| | 15 | 5 | aab3 | episode05 | Ki | ... |
| | 16 | 6 | 78wq | episode06 | Xavi | ... |
| | 17 | 7 | aab3 | episode07 | Beckham | ... |
| | 18 | 8 | 78wq | finale | Rooney | ... |

FIG.22

| Property (Metadata type) | ObjectID | aggregatedObjectID | originalServerUDN | title | creator | ... |
|---|---|---|---|---|---|---|
| Aggregate Object on AMS | 11 | 1 | aab3 | episode01 | Torres | ... |
| | 13 | 3 | aab3 | episode03 | Ronaldo | ... |
| | | | deleted | | | |
| | 15 | 5 | aab3 | episode05 | Ki | ... |
| | 16 | 6 | 78wq | episode06 | Xavi | ... |
| | 17 | 7 | aab3 | episode07 | Beckham | ... |
| | 18 | 8 | 78wq | finale | Rooney | ... |

FIG.23

| Property (Metadata type) | ObjectID | aggregatedObjectID | originalServerUDN | title | creator | ... |
|---|---|---|---|---|---|---|
| Aggregate Object on AMS | 11 | 1 | aab3 | episode01 | Torres | ... |
| | 12 | 2 | aab3 | episode02 | Messi | ... |
| | 13 | 3 | aab3 | episode03 | Ronaldo | ... |
| | 14 | 4 | aab3 | episode04 | Park | ... |
| | 15 | 5 | aab3 | episode05 | Ki | ... |
| | 16 | 6 | 78wq | episode06 | Xavi | ... |
| | 17 | 7 | aab3 | episode07 | Beckham | ... |
| | 18 | 8 | 78wq | finale | Rooney | ... |

FIG.24

| Property (Metadata type) | ObjectID | aggregatedObjectID | originalServerUDN | title | creator | ... |
|---|---|---|---|---|---|---|
| Aggregate Object on AMS | 11 | 1 | aab3 | episode01 | Torres | ... |
| | 12 | 2 | aab3 | episode02 | Messi | ... |
| | 13 | 3 | aab3 | episode03 | Ronaldo | ... |
| | 14 | 4 | aab3 | episode04 | Park | ... |
| | 15 | 5 | aab3 | episode05 | Ki | ... |
| | 16 | 6 | 78wq | episode06 | Unknown | ... |
| | 17 | 7 | aab3 | episode07 | Beckham | ... |
| | 18 | 8 | 78wq | episode08 | Rooney | ... |

FIG.27

| Property (Metadata type) | ObjectID | aggregatedObjectID | originalServerUDN | parentID | creator | ... |
|---|---|---|---|---|---|---|
| Aggregate Object on AMS | 11 | 1 | aab3 | 0 | Kim | ... |
| | 12 | 2 | aab3 | 11 | Messi | ... |
| | 13 | 3 | aab3 | 11 | Messi | ... |
| | 14 | 4 | aab3 | 11 | Park | ... |
| | 15 | 5 | aab3 | 14 | Ki | ... |
| | 16 | 6 | aab3 | 14 | Xavi | ... |
| | 17 | 7 | aab3 | 15 | Beckham | ... |
| | 18 | 8 | aab3 | 17 | Unknown | ... |

FIG.28

| Property (Metadata type) | ObjectID | aggregatedObjectID | originalServerUDN | parentID | creator | ... |
|---|---|---|---|---|---|---|
| Aggregate Object on AMS | 11 | 1 | aab3 | 0 | Kim | ... |
| | 12 | 2 | aab3 | 11 | Messi | ... |
| | 13 | 3 | aab3 | 11 | Messi | ... |
| | | | deleted | | | |
| | 15 | 5 | aab3 | 14 | Ki | ... |
| | 16 | 6 | aab3 | 14 | Xavi | ... |
| | 17 | 7 | aab3 | 15 | Beckham | ... |
| | 18 | 8 | aab3 | 17 | Unknown | ... |

FIG.29

| Property (Metadata type) | ObjectID | aggregatedObjectID | originalServerUDN | parentID | creator | ... |
|---|---|---|---|---|---|---|
| | 11 | 1 | aab3 | 0 | Torres | ... |
| | 12 | 2 | aab3 | 11 | Messi | ... |
| | 13 | 3 | aab3 | 11 | Messi | ... |
| Aggregate Object on AMS | | | deleted | | | |
| | 15 | 5 | aab3 | 14 | Ki | ... |
| | 16 | 6 | aab3 | 14 | Xavi | ... |
| | 17 | 7 | aab3 | 15 | Beckham | ... |
| | 18 | 8 | aab3 | 17 | Unknown | ... |

FIG.30

| Property (Metadata type) | ObjectID | aggregatedObjectID | originalServerUDN | parentID | creator | ... |
|---|---|---|---|---|---|---|
| | 11 | 1 | aab3 | 0 | Torres | ... |
| | 12 | 2 | aab3 | 11 | Messi | ... |
| | 13 | 3 | aab3 | 11 | Ronaldo | ... |
| | 14 | 4 | aab3 | 11 | Park | ... |
| Aggregate Object on AMS | 15 | 5 | aab3 | 14 | Ki | ... |
| | 16 | 6 | aab3 | 14 | Xavi | ... |
| | 17 | 7 | aab3 | 15 | Beckham | ... |
| | 18 | 8 | aab3 | 17 | Unknown | ... |

FIG.31

| Property (Metadata type) | ObjectID | aggregatedObjectID | originalServerUDN | parentID | creator | |
|---|---|---|---|---|---|---|
| Aggregate Object on AMS | 11 | 1 | aab3 | 0 | Torres | ... |
| | 12 | 2 | aab3 | 11 | Messi | ... |
| | 13 | 3 | aab3 | 11 | Ronaldo | ... |
| | 14 | 4 | aab3 | 11 | Park | ... |
| | 15 | 5 | aab3 | 14 | Ki | ... |
| | 16 | 6 | aab3 | 14 | Unknown | ... |
| | 17 | 7 | aab3 | 15 | Beckham | ... |
| | 18 | 8 | aab3 | 17 | Rooney | ... |

FIG.32

```
<AggregationStatus>
 <AggregatedCDS> :for the 1st aggregated CDSe
  <mediaserverID>The UDN</mediaserverID>
  <powerState>The Power State</powerState>
  <aggregateCriteria>SearchCriteria</aggregateCriteria>
  <aggregateProgress>The Progress</aggregateProgress>

</AggregatedCDS>
 ...
 ...
 <AggregatedCDS> :for the last aggregated CDS
  <mediaserverID>The UDN</mediaserverID>
  <powerState>The Power State</powerState>
  <aggregateCriteria>SearchCriteria</aggregateCriteria>
  <aggregateProgress>The Progress</aggregateProgress>
 </AggregatedCDS>
</AggregationStatus>
```

FIG.34

| Property (Metadata type) | ObjectID | aggregatedObjectID | originalServerUDN | parentID | creator | ... |
|---|---|---|---|---|---|---|
| Aggregated Object on ADMS#1 | 1 | – | – | 0 | Torres | ... |
| | 2 | – | – | 1 | Messi | ... |
| | 3 | – | – | 1 | Ronaldo | ... |
| Aggregate Object on AMS | 14 | 1 | aab3 | 11 | Torres | ... |
| | 15 | 2 | aab3 | 14 | Messi | ... |
| | 16 | 3 | aab3 | 14 | Ronaldo | ... |

FIG.35

| Property (Metadata type) | ObjectID | aggregatedObjectID | originalServerUDN | parentID | creator | ... |
|---|---|---|---|---|---|---|
| Aggregated Object on ADMS#1 | 1 | – | – | 0 | Torres | ... |
| | 2 | – | – | 1 | Messi | ... |
| | 3 | – | – | 1 | Ronaldo | ... |
| Aggregate Object on AMS | 14 | 1 | aab3 | 11 | Smith | ... |
| | 15 | 2 | aab3 | 14 | Messi | ... |
| | 16 | 3 | aab3 | 14 | Ronaldo | ... |

FIG.36

| Property (Metadata type) | ObjectID | aggregatedObjectID | originalServerUDN | parentID | creator | ... |
|---|---|---|---|---|---|---|
| Aggregated Object on ADMS#1 | 1 | - | - | 0 | Torres | ... |
| | 2 | - | - | 1 | Ronaldo | ... |
| | 3 | - | - | 1 | Ronaldo | ... |
| Aggregate Object on AMS | 14 | 1 | aab3 | 11 | Smith | ... |
| | 15 | 2 | aab3 | 14 | Messi | ... |
| | 16 | 3 | aab3 | 14 | Ronaldo | ... |

FIG.37

| Property (Metadata type) | ObjectID | aggregatedObjectID | originalServerUDN | parentID | creator | ... |
|---|---|---|---|---|---|---|
| Aggregated Object on ADMS#1 | 1 | - | - | 0 | Torres | ... |
| | 2 | - | - | 1 | Ronaldo | ... |
| | | | deleted | | | |
| Aggregate Object on AMS | 14 | 1 | aab3 | 11 | Smith | ... |
| | 15 | 2 | aab3 | 14 | Messi | ... |
| | 16 | 3 | aab3 | 14 | Ronaldo | ... |

CONTROL DEVICE, CONTROL TARGET DEVICE AND METHOD OF TRANSMITTING CONTENT INFORMATION THEREOF

CROSS-REFERENCE TO RELATED APPLICATIONS

The present application claims priority under 35 U.S.C. 119 and 35 U.S.C. 365 to U.S. patent application Ser. No. 61/559,119 (filed on Nov. 13, 2011), U.S. patent application Ser. No. 61/661,312 (filed on Jun. 18, 2012) and U.S. patent application Ser. No. 61/670,109 (filed on Jul. 10, 2012), which is hereby incorporated by reference in its entirety.

BACKGROUND

The present invention relates to a method of controlling a control device and a server, and more particularly, to a method of controlling an aggregation function of a server.

A universal plug and play (UPnP) technology and a digital living network alliance (DLNA) technology allow services and controls between home appliances of various manufactures. Especially, the UPnP technology allows compatible AV services and controls between audio-video (AV) devices. These compatible AV services include media streaming, uploading, and downloading.

The DLNA, as a home network device, includes a digital media server (DMS), a digital media player (DMP), a digital media renderer (DMR), a digital media controller (DMC), and a digital media printer (DMPr), and, as a mobile portable device, includes a mobile digital media server (M-DMS), a mobile digital media player (M-DMP), a mobile digital media uploader (M-DMU), a mobile digital media downloader (M-DMD), and a mobile digital media controller (M-DMC). Hereinafter, a digital media server (DMS) conceptually includes the M-DMS; a digital media player (DMP) conceptually includes the M-DMP; and a digital media controller (DMC) conceptually includes the M-DMC.

The UPnP classifies such devices into control point (CP) devices and control target devices. The DMC and DMP may be classified into a control point device, and the DMR, DMS, and DMPr may be classified into a control target device.

Moreover, the DLNA may define a 2 Box Model and a 3 Box Model.

The 2 Box Model includes a DMP and a DMS. In the 2 Box Model, the DMP allows a user to search for and play contents browsed and distributed by the DMS.

The 3 Box Model includes a DMC, a DMS, and a DMR. In the 3 Box Model, the DMC allows a user to search for the contents of the DMS, which are to be played in the DMR.

When a CP device of the UPnP or a DMP and DMC of the DLNA request content metadata to a control target device of the UPnP or a DMS of the DLNA, the control target device or the DMS collects a plurality of content metadata (generated content list) corresponding to each stored content and transmits them to a CP device, a CMP, or a DMC.

As the number of UPnP devices or DLNA devices used in homes or markets is increased, it is generalized that a plurality of digital media servers are included on a home network. As the number of digital media servers on a home network is increased, it becomes more difficult to find, manage, and organize media contents in a plurality of digital media servers. If a user cannot know which server contains contents that the user wants to find using the UPnP technology or DLNA technology, all digital media servers on a home network need to be searched.

SUMMARY

Embodiments provide a control device for setting an aggregation server that collects information stored in another server among a plurality of servers belonging to the same network.

Embodiments also provide a control device for setting a negotiation server that activates an aggregation function of another server.

In one embodiment, a method of controlling an aggregate server that collects content information stored in an aggregated device is provided. The method includes: requesting an aggregated device list to the aggregate server; receiving the aggregated device list from the aggregate server; selecting at least one aggregated device from the received aggregated device list; requesting, to the aggregate server, content information collected from the selected aggregated device; and receiving, from the aggregate server, the content information of the selected aggregated device transmitted.

In another embodiment, a method of controlling an aggregate server that collects content information stored in an aggregated device is provided. The method includes: transmitting a content information change request signal to the aggregate server; and transmitting, to the aggregate server, a recovery request signal of content information changed in response to the content information change request signal.

In further another embodiment, a control device for controlling an aggregate server that collects content information stored in an aggregated device is provided. The device includes: a network interface transmitting a content information change request signal to the aggregate server and transmitting a recovery request signal of changed content information to the aggregate server; and a control unit controlling the network interface to transmit a content information change request signal and a recovery request signal of the content information changed in response to the content information change request signal, to the aggregate server.

The details of one or more embodiments are set forth in the accompanying drawings and the description below. Other features will be apparent from the description and drawings, and from the claims.

BRIEF DESCRIPTION OF THE DRAWINGS

FIG. 10 is a view illustrating an AMS setting standard according to an embodiment of the present invention.

FIG. 19 is a table illustrating aggregate object information on an AMS according to an embodiment of the present invention.

FIG. 20 is a table illustrating aggregate object information updated on an AMS according to an embodiment of the present invention.

FIG. 21 is a table illustrating aggregate object information destroyed on an AMS according to an embodiment of the present invention.

FIG. 22 is a table illustrating the case that specific aggregate object information on an AMS is refreshed according to an embodiment of the present invention.

FIG. 23 is a table illustrating the case that all aggregate object information destroyed on an AMS is refreshed according to an embodiment of the present invention.

FIG. 24 is a table illustrating the case that all aggregate object information updated on an AMS is refreshed according to an embodiment of the present invention.

FIG. 27 is a table illustrating aggregate object information updated on an AMS according to another embodiment of the present invention.

FIG. 28 is a table illustrating aggregate object information destroyed on an AMS according to another embodiment of the present invention.

FIG. 29 is a table illustrating the case that specific aggregate object information on an AMS is refreshed according to another embodiment of the present invention.

FIG. 30 is a table illustrating the case that specific aggregate object information on an AMS is refreshed according to another embodiment of the present invention.

FIG. 31 is a table illustrating the case that specific aggregate object information on an AMS is refreshed according to another embodiment of the present invention.

FIG. 32 is a view illustrating ADMS related information of an XML type stored in an AMS according to an embodiment of the present invention.

FIGS. 34 to 37 are tables representing information stored on an AMS and an ADMS when the AMS transmits a request from a control point device to the ADMS according to an embodiment of the present invention.

DETAILED DESCRIPTION OF THE EMBODIMENTS

Hereinafter, a mobile terminal relating to the present invention will be described in more detail with reference to the drawings. The suffix "module" and "unit" for components, which are used in the description below, are assigned and mixed in consideration of only the easiness in writing the specification. That is, the suffix itself does not have different meanings or roles Hereinafter, referring to FIG. 1, a content information aggregation protocol according to an embodiment of the present invention will be described.

Figure 1:
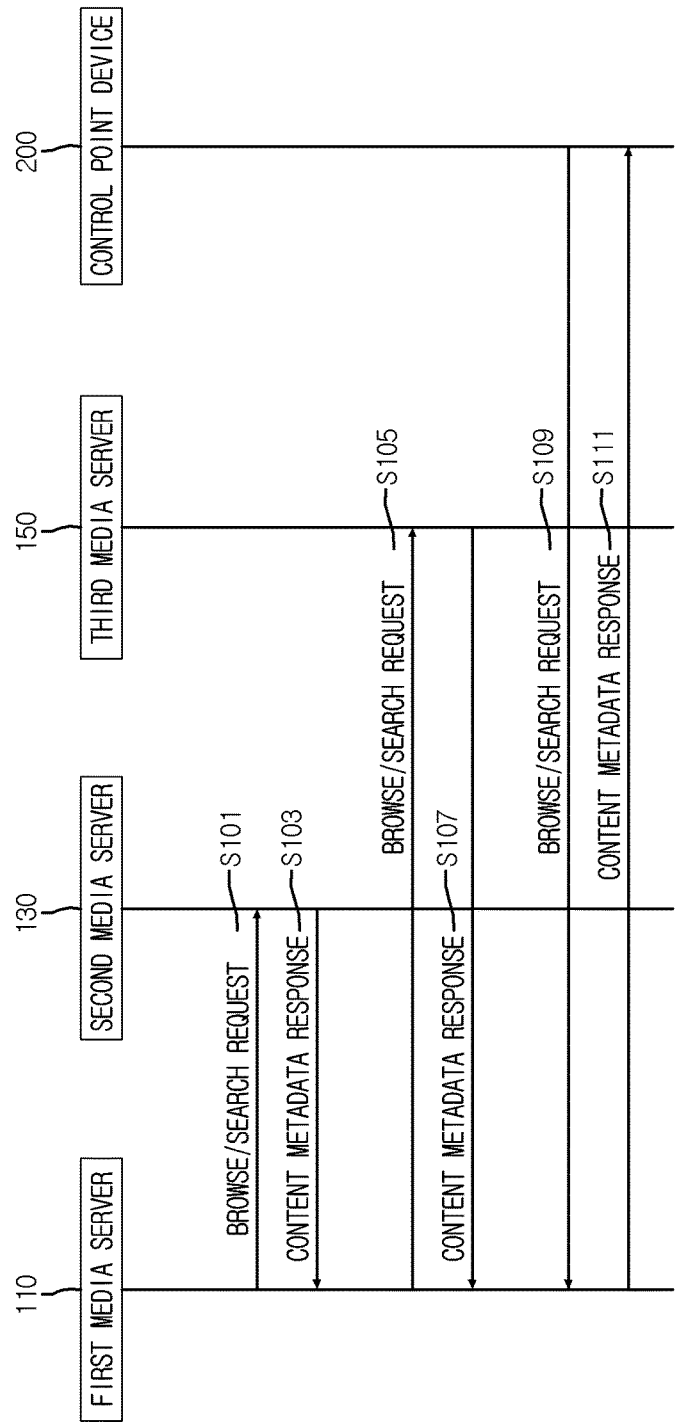
FIG. 1 is a flowchart illustrating a content information aggregation operation of a media server according to an embodiment of the present invention.

FIG. 1 is a flowchart illustrating a content information aggregation operation of a media server according to an embodiment of the present invention. Hereinafter, the media server is used as a digital media server with the same meaning. Additionally, content is used as media content with the same meaning. Content information may include content metadata or content objects in a sense. The content objects may mean a set of content metadata. The content objects may include an item object of a single file format and a container object in a folder format including a plurality of files.

Referring to FIG. 1, a first media server 110 may receive content metadata transmitted from each of a plurality of media servers 130 and 150. A media server provides a content directory service (CDS) in order to allow a user to browse the content stored in the media server and obtain the detail information on each content.

The first media server 110 may receive each content metadata from the second media server 130 and the third media server 150 by using the Browse/Search action of the CDS. For example, when the first media server 110 requests the Browse/Search action to the second media server 130 in operation S101, the second media server 130 may transmit each content metadata of the content stored in the second media server 130 to the first media server 110 by using the CDS in response to the request in operation S103. Additionally, the first media server 110 requests the Browse/Search action to the third media server 150 in operation S105, and receives each content metadata of the content stored in the third media server 150 from the third media server 150 in response to the request in operation S107. Then, the first media server 110 may collect all content information within a home network for providing a unified user experience. The aggregation function of the first media server 110 may be activated or deactivated (turn on/off). The first media server 110 may provide useful information on aggregation through state variables, content metadata, and additional control mechanism. The additional useful control mechanism provides several actions, thereby providing more improved user experience.

At this point, the content metadata set, that is, a content object, which becomes a collection target of an aggregated media server (ADMS) such as the first media server 110 after being included in the second media server 130 and the third media server 150, that is, a content object, may be defined as an aggregated object. The AMS may collect the aggregated object and then, may recreate an aggregate object corresponding thereto. That is, the aggregate object may be defined as an object that is recreated by the AMS on the basis of the content metadata collected from an aggregated media server (ADMS) such as the second media server 130 and the third media server 150 and the same aggregated CDS.

According to an embodiment of the present invention, the first media server 110, as a virtual server, i.e. a kind of a media server, may collect all content metadata physically or logically by using the CDS. At this point, the virtual server may collect content metadata stored in any device. Accordingly, the virtual server may collect content metadata from a plurality of native servers. The native server may mean a server of the original meaning, which stores or provides content and content related information, like the above-mentioned second media server 130 and third media server 150. On the other hand, the virtual server may perform the same function as a control point device that requests and receives content or content related information.

Moreover, in the case of a virtual server collecting content from a plurality of native servers, it needs to have a unique name on a network in order to represent a function that an aggregating virtual server performs content transformation. Additionally, when the aggregating virtual server virtualizes an issue of ssdp:byebye or CACHE-CONTROL intervals of all native servers expire without receiving an advertisement set, An ssdp:byebye message needs to be issued within a predetermined time, for example, 5 sec. A Simple Service Discovery Protocol (SSDP) means a protocol for searching for an available service with a device connected to a network.

A virtual server that does not collect content from a plurality of native servers needs to provide all actions that a basic native server provides. Additionally, a virtual server that does not perform an aggregation function needs to allow all events of a native server to be possible. On the other hand, a virtual server that collects content from a plurality of native servers may restrict an action or event that the virtual server itself provides.

While a virtual server collects content metadata from a large number of native servers, if one of the native servers leaves a network, a query issued after the native server leaves the network, for example, after 1 sec, should not show content metadata of a content stored in the native server that leaves the network in a layer.

According to an embodiment of the present invention, if an aggregation virtual server collects a content from a plurality of native servers, it should be capable of collecting content metadata from all native servers on a current network, and should specify a "*" flag in a <dlna:X_DLNA-VIRT> XML element of a device description of the aggregation virtual server.

Then, if there are a plurality of media servers, a control point device 200, which receives a user input including a search request on content metadata of a media content, requests a browse/search action to the first media server 110 performing a function of a virtual server in operation S109, and receives the content metadata stored in the first media server 110 in operation S111. The content metadata stored in the first media server 110 may include all content metadata collected from the plurality of media servers 130 and 150 in a home network. Accordingly, the control point device 200 may receive all content metadata included in all the plurality of media servers by just requesting a browse/search action once to one media server. This is efficient when a user wants to find a specific content, whose location is not known in a media server on a home network including a plurality of media servers.

Hereinafter, referring to FIGS. 2 to 4, a content information aggregation protocol according to an embodiment of the present invention will be described.

Figure 2:
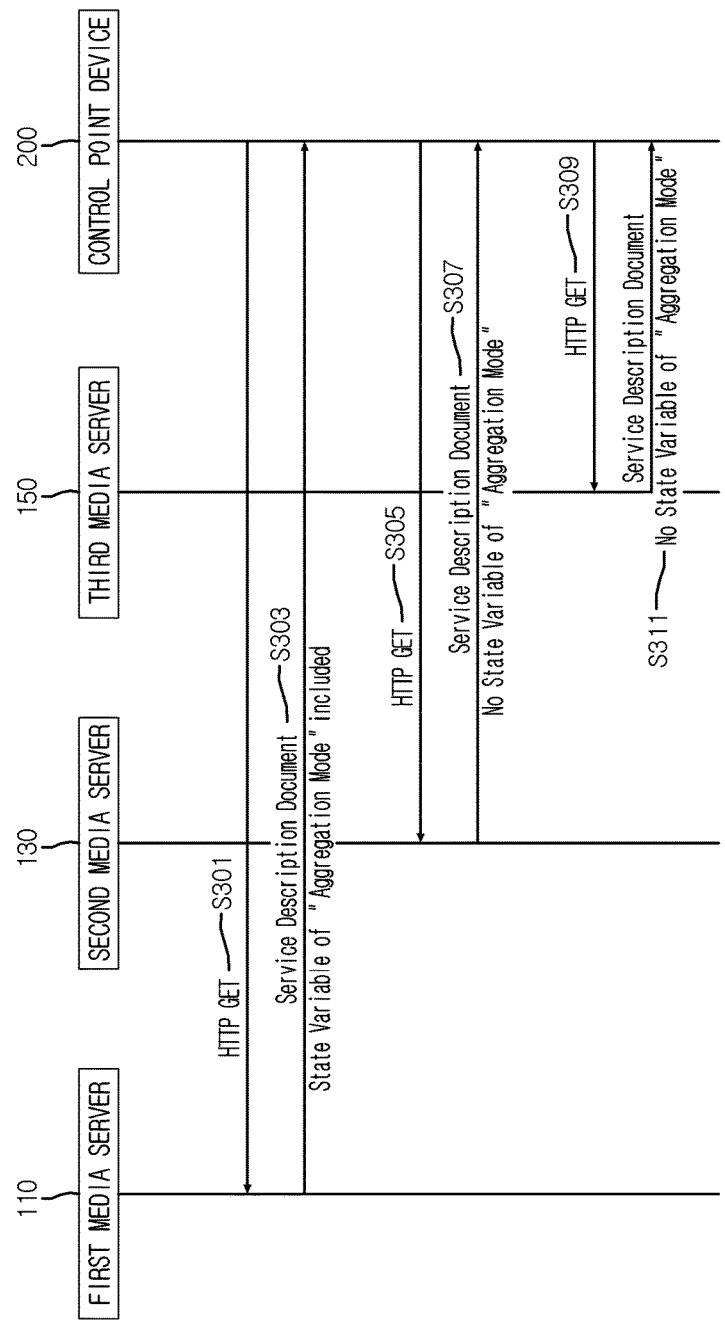
FIG. 2 is a flowchart illustrating a method of distinguishing a media server supporting a content information aggregation function according to an embodiment of the present invention.

FIG. 2 is a flowchart illustrating a method of distinguishing a media server supporting a content information aggregation function according to an embodiment of the present invention.

Referring to FIG. 2, a control point device 200 may receive a Service Description Document in a document format from each of a plurality of media servers. The control point device 200 may recognize that a corresponding media server is a media server supporting a content information aggregation function by using the received service description.

The media server may provide an aggregation CDS. The aggregation CDS may provide a single point device to access all contents in a home network. A physical CDS structure or a virtual structure of an aggregation CDS may provide at least one control point module. The control point module may be defined as a module that sets metadata properties relating to an aggregation characteristic and operates actions relating to an aggregation characteristic. For example, the control point module may be a module that performs the same function as the control point device for requesting and receiving a content stored in another media server and content related information in the above-described virtual server. That is, the media server providing an aggregation CDS may include a control point module that collects contents of other media servers and content related information.

The service description may include information on a service that a media server provides. The control point device 200 may transmit an HTTP GET request to a media server, and may receive the service description of a corresponding media server created in an XML format in response to the request. Thus, a procedure described with reference to FIG. 2 may be performed during a process that the control point device 200 searches for an UPnP device or a DLNA device included in a home network.

The control point device 200 may determine whether a corresponding media server supports a content information aggregation function according to whether an AggregationMode State Variable is included in the received service description. The media server may be divided into a media server supporting a content information aggregation function and a media server not supporting a content information aggregation function, according to whether to support a content information aggregation function. Additionally, the media server supporting a content information aggregation function may be divided into an Aggregation Capable Media Server (ACMS) and an Aggregation Media Server (AMS). The ACMS may mean a server that is capable of performing a content information aggregation function but currently does not perform it, and the AMS may mean a media server that is currently performing a content information aggregation function. Hereinafter, a Legacy Media Server (LMS) is used as a media server that does not support a content information aggregation function with the same meaning. Additionally, in correspondence to an AMS (i.e. a media server currently performing a content information aggregation function), a media server, which is a target of content information aggregation of a current AMS, may be defined as an ADMS.

Even if there is a media server supporting a content information aggregation function in a network, the control point device 200 may not distinguish a media server supporting a content information aggregation function from a media server not supporting a content information aggregation function. Accordingly, the control point device 200 may request a service description to each of a plurality of media servers, and by receiving the service description including an Aggregation mode state variable, may distinguish a media server supporting a content information aggregation function.

A media server supporting a content information aggregation function may show that the media server itself is a media server supporting a content information aggregation function by transmitting a newly defined state variable such as an aggregation mode state variable to the control point device 200. As shown in FIG. 2, when the control point device 200 requests an HTTP GET to the first media server 110 in operation S301, the first media server 110 transmits a service description document including an aggregation mode state variable to the control point device 200 in response to the request in operation S303. The control point device 200 may recognize that the first media server 110 is a media server supporting a content information aggregation function through the aggregation mode state variable included in the service description document.

On the other hand, a media server not supporting content information aggregation function may transmit a service description not including an aggregation mode state variable to the control point device 200. As shown in FIG. 2, when the control point device 200 requests an HTTP GET to the second media server 130 or the third media server 150 in operations S305 and S309, the second media server 130 or the third media server 150 transmits a service description document not including an aggregation mode state variable to the control point device 200 in response to the request in operations S307 and S311. The control point device 200 may confirm that the aggregation mode state variable is not included in the service description document, and thus, may recognize that the second media server 130 or the third media server 150 is a media server not supporting a content information aggregation function.

The properties of an aggregation mode state variable may include a state variable name, an event, a data type, and a default value, and are not limited thereto. The state variable name is an aggregation mode. The event is possible, and an AMS may notify a control point device or another ACMS that the AMS itself is a media server performing a current content information aggregation function. The event may be impossible, and in this case, the control point device 200 may recognize, by applying an action for obtaining an aggregation mode to an AMS, whether a corresponding AMS performs an aggregation function. The data type may be a Boolean type. When the data value is '0', this is the case that the aggregation function of a corresponding media server is turned off, and represents that the corresponding media server is an ACMS not an AMS. When the data value is '1', this is the case that the aggregation function of a corresponding media server at that instant is turned on, and represents that the corresponding media server is an AMS. The default value may be determined according to a policy. For example, when a media server is basically set up as an ACMS with the default value of '0', unnecessary network traffic caused due to at least one AMS may be prevented.

Hereinafter, when a plurality of AMSs on a network performs a content information aggregation function, a method of setting only one media server among the AMSs as an AMS will be described.

Figure 3:
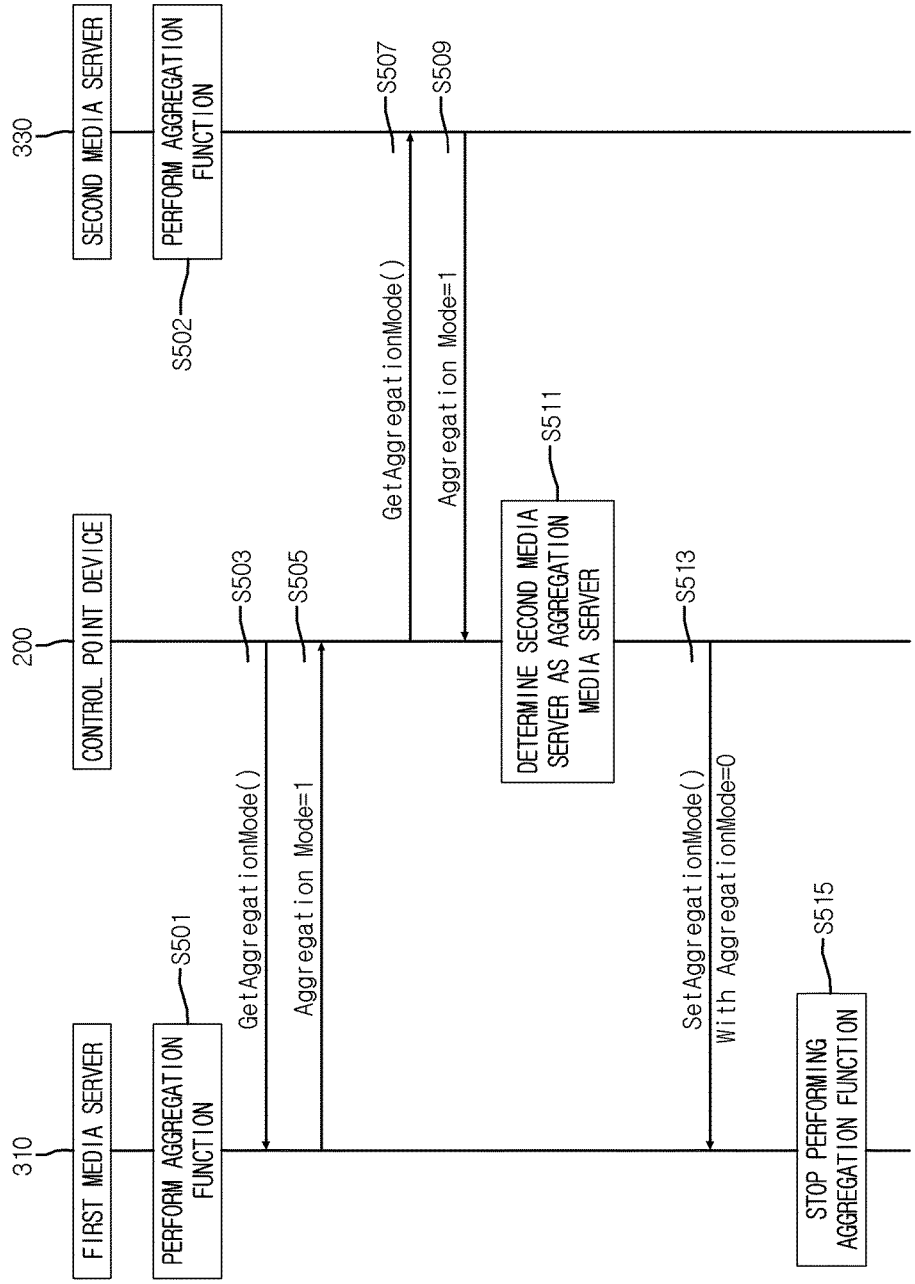
FIG. 3 is a flowchart illustrating a method of setting an AMS executing a content information aggregation protocol according to another embodiment of the present invention.

FIG. 3 is a flowchart illustrating a method of setting an AMS executing a content information aggregation protocol according to another embodiment of the present invention.

Referring to FIG. 3, each of a first media server 310 and a second media server 330 on one network performs an aggregation function in operations S501 and S502. Each of the first media server 310 and the second media server 330 is a media server supporting a content information aggregation function. For example, when all the data values of aggregation mode state variables correspond to '1', it indicates that current content information aggregation functions are turned on. That is, all the first media server 310 and second media server 300 correspond to an AMS.

A control point device 200 transmits a GetAggregationMode to the first media server 310 in operation S503. The GetAggregationMode may be a command on requesting an aggregation mode state variable to distinguish an AMS among media servers supporting a plurality of content information aggregation functions.

The control point device 200 may confirm whether to support the content information aggregation function of a media server according to a user input received through an internally or externally connected user interface. For example, when receiving a user input for selecting the first media server 310 or the second media server 330 through the user interface, the control point device 200 may transmit a GetAggregationMode to the selected media server, and, by receiving a response signal corresponding to the GetAggregationMode, may confirm whether to support the content information aggregation function of the selected media server in response to the user input.

The properties of the GetAggregationMode may include an action name, arguments, and related state variables, and are not limited thereto. The action name may be a GetAggregationMode. The argument, as a variable corresponding to a command, may be an AggregationMode corresponding to the GetAggregationMode; the direction of the AggregationMode may be defined as OUT; and a target receiving the GetAggregationMode, for example, the first media server 310, may be a subject transmitting the AggregationMode. The related state variable may be an AggregationMode. When the recovered value of the related state variable is '0', it means that a corresponding media server is an ACMS not an AMS, and when the recovered value of the related state variable is '1', it means that a corresponding media server is an AMS.

The control point device 200 receives information including an AggregationMode transmitted from the first media server 310, in response to the GetAggregationMode in operation S505. When the first media server 310 transmits the AggregationMode having the data value of '1', the control point device 200 recognizes that the first media server 310 is an AMS. Moreover, the control point device 200 may recognize that a corresponding media server is an AMS through an event message transmitted from the media server without transmitting the GetAggregationMode to the media server, and is not limited thereto. For example, the control point device 200 may recognize that the first media server 310 is an AMS by receiving the event message including the AggregationMode having the data value of '1'.

Additionally, the first media server 310 may transmit a device description to the control point device 200 in response to a device description request transmitted from the control point device 200. At this point, the device description may include a FriendlyName changed together with the AggregationMode. For example, when being connected to a plurality of servers, the control point device 200 may display a media server FriendlyName list including the FriendlyNames of the plurality of servers on a display unit in order to provide it to a user. Then, when receiving the changed FriendlyName transmitted from the first media server 310, the control point device 200 may display the changed FriendlyName of the first media server 310 on a display unit. A user may identify a media server executing an aggregation mode through the media server FriendlyName list displayed on the display unit of the control point device 200. Since the FriendlyName represents an aggregation mode state of a corresponding media server, for example, "all your content aggregated", a user may distinguish the manufacturer name or model name of a corresponding media server from the id that is difficult to identify the state of a corresponding media server. Thus, when an AMS starts to perform an aggregation function, it may notify the control point device 200 whether to support an aggregation function by changing the FriendlyName representing an operation for collecting content metadata in a corresponding network.

As described above, the control point device 200 transmits a GetAggregationMode to the second media server 330 in operation S507. For this, when the second media server 330 transmits the AggregationMode having the data value of '1' in operation S509, the control point device 200 recognizes that the second media server 330 is an AMS.

Then, the control point device 200 sets the second media server 330 as an AMS in operation S511. That is, the control point device 200 sets only the second media server 330 as an AMS, and sets the first media server 310 as an ACMS, not any more an AMS. In this case, the first media server 310, as an aggregation function target, may be an ADMS, but is not limited thereto. The control point device 200 may recognize that a plurality of media servers execute current content information aggregations through the AggregationMode transmitted from the first media server 310 and the second media server 330. However, if two AMSs are not necessary in one network, only one of them performing an aggregation function is enough. The control point device 200 may confirm whether a media server supports and performs an aggregation function, and may control it. According to a control of the control point device 200, a target media server may or may not perform an aggregation function.

Additionally, the control point device 200 may receive a user input for setting or changing an aggregation mode state of a media server through a user interface. According to an embodiment of the present invention, the control point device 200 may receive a user input for selecting one media server among a plurality of media servers performing a plurality of aggregation functions as a server for performing an aggregation function, through a user interface. For example, the control point device 200 may receive a user input for setting the aggregation mode state of the second media server to "on" or a user input for setting the aggregation mode state of the first media server 310 to "off", through the user interface.

Then, the control point device 200 transmits a SetAggregationMode including the AggregationMode having the data value of '0' to the first media server 310 in operation S513. The control point device 200 may stop the aggregation function of the first media server 310 in order to allow only the second media server 330 to perform a content information aggregation function. The control point device 200 may control the aggregation function of the first media server 310 by using a SetAggregationMode. The SetAggregationMode may be a control command for controlling the aggregation function of a media server supporting a content information aggregation function to be activated or deactivated.

The properties of the SetAggregationMode may include an action name, arguments, and related state variables, and are not limited thereto. The action name may be a SetAggregationMode. The argument, as a variable corresponding to a command, may be an AggregationMode corresponding to the SetAggregationMode; the direction of the AggregationMode may be defined as IN; and a target receiving the SetAggregationMode, for example, the first media server 310, may receive the AggregationMode also. At this point, error codes may include 741, i.e. a useless parameter. The error codes may mean that the value of an aggregation mode argument is identical to the current value of an aggregation state variable. The related state variable may be an AggregationMode. When the recovered value of the related state variable is '0', it means that the aggregation mode of a corresponding media server is deactivated, and when the recovered value of the related state variable is '1', it means that the aggregation mode of a corresponding media server is activated.

The first media server 310, which receives the SetAggregationMode including the AggregationMode having the data value of '0', stops the aggregation function in operation S515. Therefore, according to a control of the control point device 200, only the second media server 330 as an AMS may perform a content information aggregation function on a network.

Figure 4:
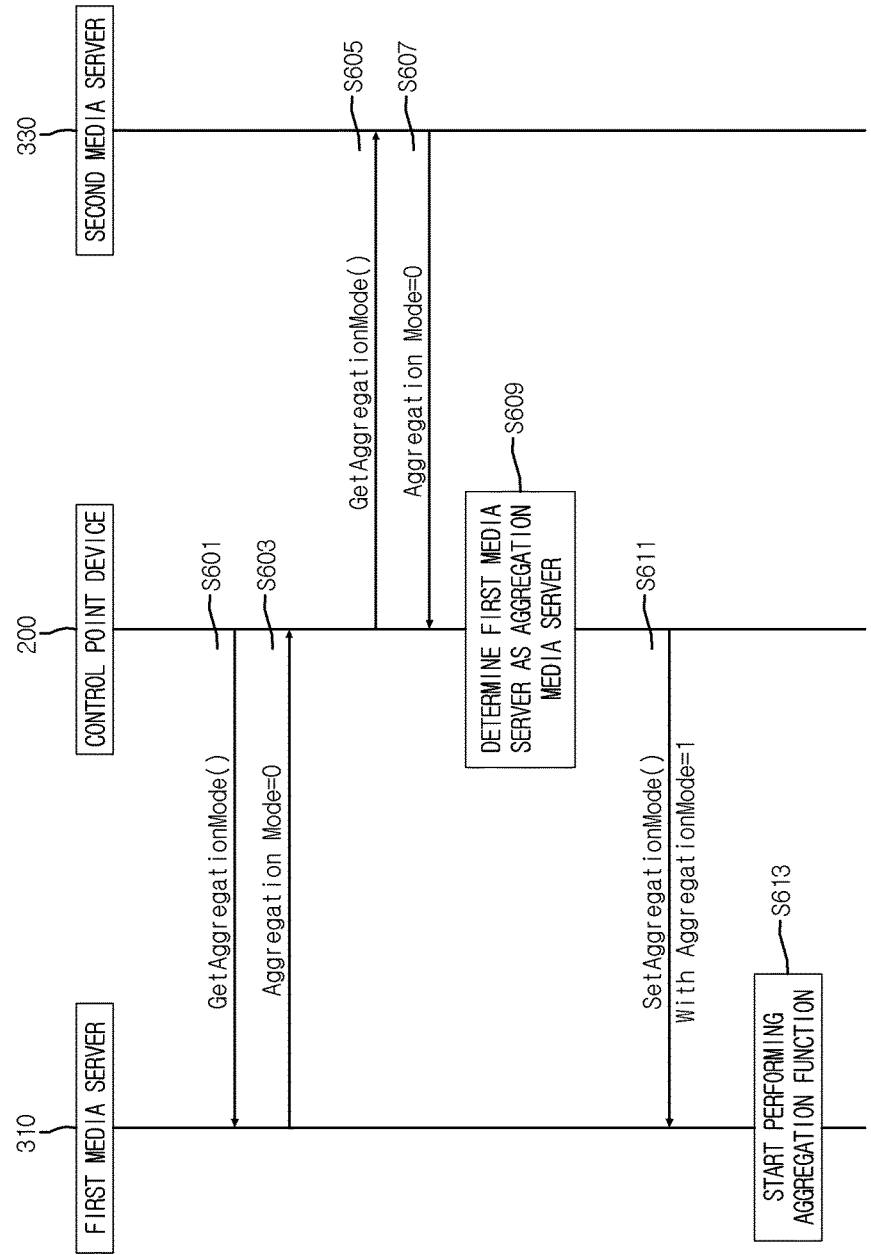
FIG. 4 is a flowchart illustrating a method of setting an AMS executing a content information aggregation protocol according to another embodiment of the present invention.

FIG. 4 is a flowchart illustrating a method of setting an AMS executing a content information aggregation protocol according to another embodiment of the present invention.

Hereinafter, the same part described with reference to FIG. 3 will be omitted.

Referring to FIG. 4, each of a first media server 310 and a second media server 330 does not perform an aggregation function on one network. In relation to the first media server 310 and the second media server 330, since all the data values of the AggregationMode correspond to '0', a current content information aggregation function may be turned off.

When the control point device 200 transmits a GetAggregationMode to the first media server 310 in operation S601, it receives information including an AggregationMode transmitted from the first media server 310, in response to the GetAggregationMode in operation S603. When the first media server 310 transmits the AggregationMode having the data value of '0', the control point device 200 recognizes that the first media server 310 does not perform a function of an AMS. Moreover, the control point device 200 may recognize whether a corresponding media server performs an aggregation function through an event message transmitted from the media server without transmitting the GetAggregationMode to the media server, and is not limited thereto. For example, the control point device 200 may recognize that the first media server 310 does not perform a function of an AMS by receiving the event message including the AggregationMode having the data value of '0'.

The control point device 200 transmits a GetAggregationMode to the second media server 330 separately in operation S605. For this, when the second media server 330 transmits information including the AggregationMode having the data value of '0' in operation S607, the control point device 200 recognizes that the second media server 330 does not perform a function of an AMS. Then, the control point device 200 sets the first media server 310 as an AMS in operation S609.

The control point device 200 transmits a SetAggregationMode including the AggregationMode having the data value of '1' to the first media server 310 set as the AMS in operation S611.

The first media server 310, which receives the SetAggregationMode including the AggregationMode having the data value of '1', starts the aggregation function in operation S613. Therefore, according to a control of the control point device 200, only the first media server 310 as an AMS may perform a content information aggregation function on a network.

Hereinafter, a structure of a device constituting a 2 box model and a 3 box model of a DLNA will be described according to an embodiment of the present invention.

Figure 5:
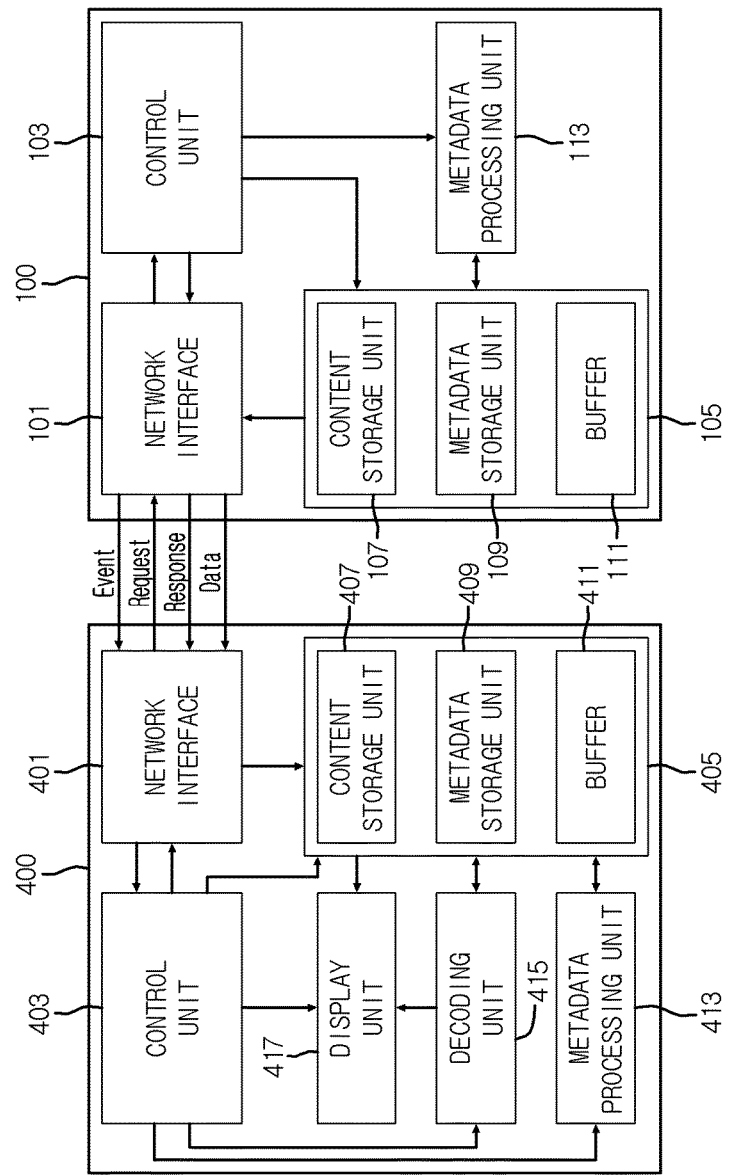
FIG. 5 is a block diagram of devices constituting a 2 box model according to an embodiment of the present invention.

FIG. 5 is a block diagram of devices constituting a 2 box model according to an embodiment of the present invention.

Referring to FIG. 5, the 2 box model of the DLNA includes a media server 100 and a media player 400. The media server may transmit an event message to a media player 400. Or, the media server 100 may transmit a response in response to the request transmitted from the media player 400. The media server 100 may transmit the data stored in the memory 105 thereof to the media player 400. The media player 400 may process and play the data transmitted from the media server 100.

The media server 100 may include a network interface 101, a control unit 103, a memory 105, and a metadata processing unit 113.

The network interface 101 of the media server 100 may receive a message including a command, request, and action, which is transmitted from the media player 400. Additionally, the network interface 101 may transmit an event message and data to the media player 400. The network interface 101 may be a physical element of the media server 100.

The control unit 103 controls an operation of each element included in the media server 100 on the basis of user input or software. The control unit 103 may be a logical element of the media server 100. For example, the control unit 103 may extracts the content metadata stored in the memory 105, and then, may transmit them to the external through the network interface 101, in response to the request received through the network interface 101.

The memory 105 stores various kinds of information. The memory 105 may be a physical element of the media server 100. The memory 105 includes a content storage unit 107, a metadata storage unit 109, and a buffer 111. The content storage unit 107 may store media content data. The metadata storage unit 109 may store metadata, i.e. information on content. The metadata storage unit 109 may classify metadata, and then, may store them. The buffer 111 may temporarily store various kinds of data. Additionally, the memory 105 may store state information on the media server 100.

The state information may include information on the hardware state or a software state of the media server 100. For example, the state information may include information on the storage size, memory, CPU performance, XML parsing capability, content change capability, connection and transfer protocol, number of stored contents, device type, aggregation mode state, and negotiation mode state of the media server 100.

The metadata processing unit 113 extracts and separates the metadata of the media content stored in the content storage unit 107. The metadata that the metadata processing unit 113 extracts and separates may be stored in the metadata storage unit 109.

Since the media server 100 stores metadata (i.e. content related information) in addition to content, it may provide information on the stored content, and also, may provide content streaming service and content upload/download service.

The media player 400 may include a network interface 401, a control unit 403, a memory 405, a metadata processing unit 413, a decoding unit 415, and a display unit 417, and may perform all functions of the above-mentioned media controller and media renderer. Hereinafter, the same part described above will be omitted.

The network interface 401 may transmit a message including a command, request, and action to the media server 100. Additionally, the network interface 401 may receive an event message and data from the media server 100.

The control unit 403 controls an operation of each element included in the media server 100 on the basis of user input or software. For example, the control unit 403 may store in the memory 405 the content received through the network interface 401, and then, may process the stored content in the decoding unit 415 in order to display the processed content on the display unit 147.

The memory 405 includes a content storage unit 407, a metadata storage unit 409, and a buffer 411. The content storage unit 407 may store the media content transmitted from the media server 100. The metadata storage unit 409 may store the metadata transmitted from the media server 100.

The metadata processing unit 413 may distinguish the data type of the metadata transmitted from the media server 100, and then, may classify them into a predetermined category in order to allow the control unit 403 to visualize or control them.

The decoding unit 415 may decode the encoded media content in order to display them on the display unit 417.

The display unit 417 visualizes various kinds of data such as a user interface or media and displays them. A user may provide a user input through a user interface displayed on the display unit 417, or may use media in a way of displaying the media on the display unit 417.

Figure 6:
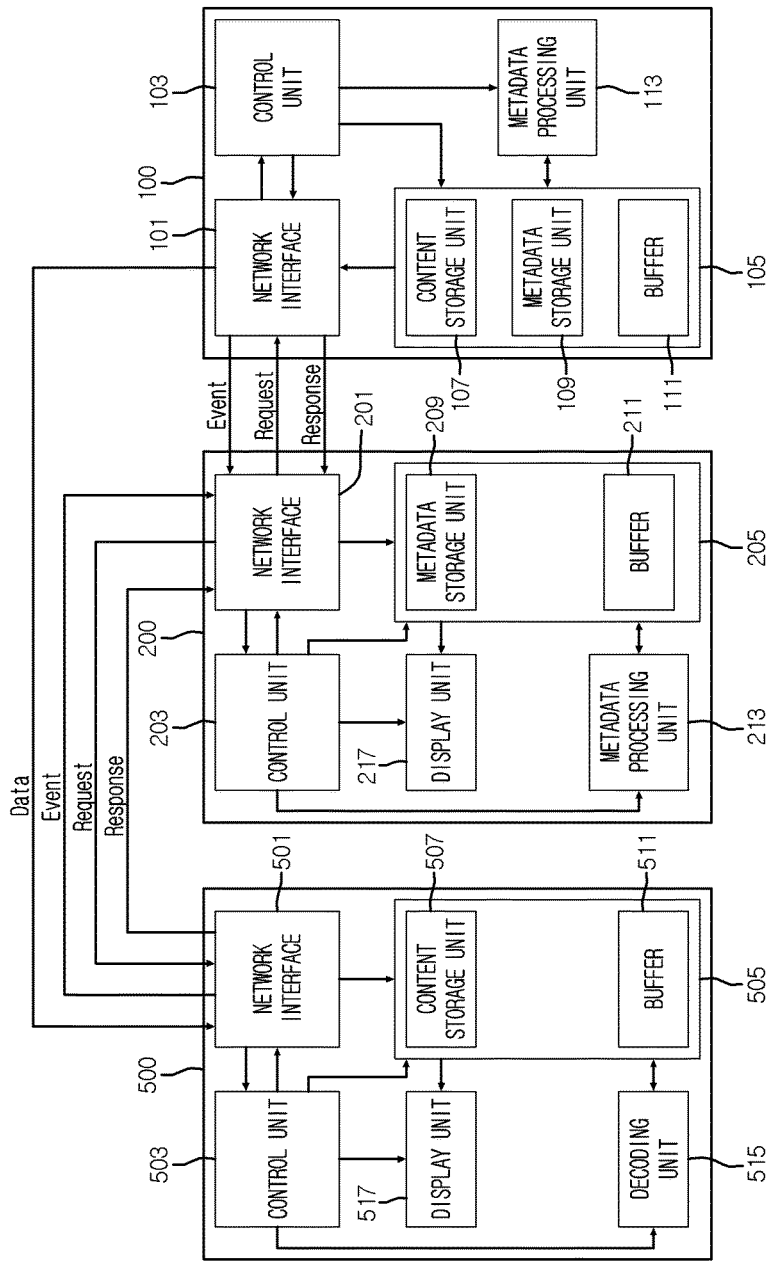
FIG. 6 is a block diagram of devices constituting a 3 box model according to an embodiment of the present invention.

FIG. 6 is a block diagram of devices constituting a 3 box model according to an embodiment of the present invention. Hereinafter, the same configuration described with the 2 box model will be omitted.

The 3 box model of a DLNA includes a media server 100 and a media controller 200, and a media renderer 500. The media server 100 may transmit to the media controller 200 an event message or a response in response to the request transmitted from the media controller 200. The media controller 200 may transmit to the media renderer 500 an event message or a response in response to the request transmitted from the media renderer 500. The media server 100 may transmit data to the media renderer 500 in response to the request transmitted from the media controller 200. The media renderer 500 may display the data transmitted from the media server 100 on the display unit 517. The media controller 200 in the 3 box model may store and process the metadata on a content transmitted from the media server 100, and the media renderer 500 may store, process, and display the content transmitted from the media server 100.

Hereinafter, referring to FIG. 7, a method of setting an AMS by a negotiation media server according to an embodiment of the present invention will be described.

Figure 7:
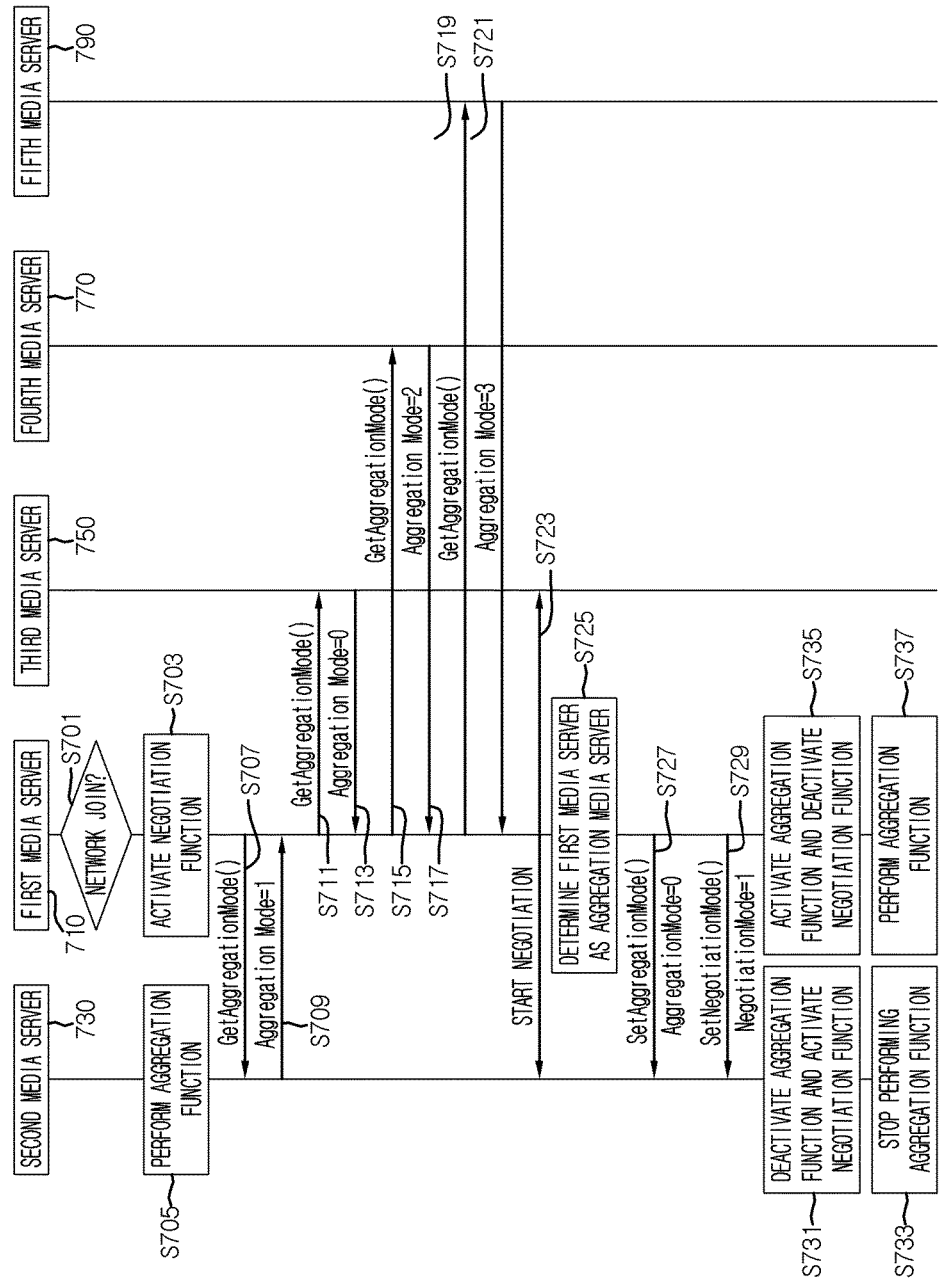
FIG. 7 is a flowchart illustrating a method of setting an AMS by a negotiation media server according to an embodiment of the present invention.

FIG. 7 is a flowchart illustrating a method of setting an AMS by a negotiation media server according to an embodiment of the present invention.

Referring to FIG. 7, the first media server 710 may set at least one among a plurality of aggregation available media servers in the same network, for example, the second to fifth media servers 730, 750, 770, and 790.

When a plurality of aggregation available media servers are connected to one network, even if a request signal is not transmitted from a control point device controlled by a user input, it is necessary for an aggregation available media server to automatically control whether to activate an aggregation function of an aggregation available media server.

However, since the control of an aggregation available media server may be done different from a user intention due to another aggregation available media server, it is necessary to instruct and set whether the aggregation function of an aggregation available media server is controlled by another aggregation available media server.

Negotiation procedures may mean automatic procedures that automatically set at least one of a plurality of aggregation available media servers as an AMS for performing an aggregation function. For example, an aggregation available media server may start such negotiation procedures.

A negotiation media server, i.e. a negotiator, may mean an aggregation available media server that starts a negotiation procedure. For example, an aggregation available media server that newly joins a network may be a negotiation media server automatically. Additionally, when a situation of a negotiation media server is changed, for example, when it becomes an AMS or is disconnected from a corresponding network, the negotiation media server may assign a negotiation media server role to another aggregation available media server in advance. When a network is disconnected, a negotiation media server may notify this to an AMS.

If there is no negotiation media server in one network, an AMS may be responsible for assigning a negotiation media server role to one aggregation available media server in a corresponding network.

Referring to FIG. 7, when the first media server 710 newly joins a network including the second to fifth media servers 730, 750, 770, and 790 in operation S701, it may be a negotiation media server. The first media server 710, i.e. a negotiation media server, may activate a negotiation function in operation S703, and then, may collect information on an aggregation mode for each of a plurality of media servers, before starting a negotiation procedure for setting the one to fifth media servers 710, 730, 750, 770, and 790, i.e. aggregation available media server, as one AMS.

The first media server 710 transmits a GetAggregationMode to the second to fifth media servers 730, 750, 770, and 790 in operations S707, S711, S715, and S719. The second to fifth media servers 730, 750, 770, and 790 receiving the GetAggregationMode may transmit a state variable having a specific value to the first media server 710. The response transmitted in response to the GetAggregationMode may include at least one of a ControllableAggregationMode state variable and an AggregationMode state variable.

The properties of a controllable AggregationMode may include a state variable name, an event, a data type, an allowed value, and a default value, and are not limited thereto. The state variable name is a ControllableAggregationMode. An event may or may not be possible. The data type may be a Boolean type or a string type. When the data type is a Boolean type, an allowed value may be '0' or '1'. When the allowed value is '0', it means that a corresponding aggregation available media server cannot be controlled by another aggregation available media server, and when the allowed value is '1', it means that a corresponding aggregation available media server can be controlled by another aggregation available media server. If the data type is a string type, an allowed value may be Not_Controllable_by_ACMS or Controllable_by_ACMS. The default value may be determined according to a policy, and for example, it is recommended that a media server be set to be controlled by another aggregation available media server with the default value of '1'. However, the default value is not limited thereto.

The properties of an AggregationMode may include a state variable name, an event, a data type, an allowed value, and a default value, and are not limited thereto. An AggregationMode described below may have the same concept as the above, or a more extended concept in terms of the data type. Hereinafter, description for the same part of the above AggregationMode will be omitted, and only the differences will be described.

The data type of the AggregationMode may allow any data type indicating four different states. For example, the data type may be 'ui1' or 'ui4'. Additionally, a string type may be applicable. If the data type is an integer type such as 'ui1' or 'ui4' with an allowed value of '0', it means that a content information aggregation function can be performed but a current content information aggregation function is not performed, and a corresponding aggregation available media server can be controlled by another aggregation available media server. If the allowed value is '1', it means that a current content information aggregation function is performed, and a corresponding aggregation available media server can be controlled by another aggregation available media server. If the allowed value is '2', it means that a current content information aggregation function is performed, but a current content information aggregation function is not performed and a corresponding aggregation available media server cannot be controlled by another aggregation available media server. If the allowed value is '3', it means that a current content information aggregation function is performed, and a corresponding aggregation available media server cannot be controlled by another aggregation available media server. If the data type is a string type, an allowed value may be Controllable_ACMS_by_ACMS, Controllable_AMS_by_ACMS, Not_Controllable_ACMS_by_ACMS, or Not_Controllable_AMS_by_ACMS. The default value may be determined according to a policy.

The first media server 710 transmits a GetAggregationMode to the second media server 730 in operation S707. Since the second media server 730 currently performs a content information aggregation function on a corresponding network in operation S705, it transmits the AggregationMode having the allowed value of '1' to the first media server 710 in response to the GetAggregationMode in operation S709. The first media server 710 recognizes that the second media server 730 performs a current content information aggregation function and can be controlled by another aggregation available media server, on the basis of the allowed value of the AggregationMode transmitted from the second media server 730.

The first media server 710 transmits a GetAggregationMode to the third media server 750 in operation S711. The third media server 750 transmits the AggregationMode having the allowed value of '0' to the first media server 710 in response to the GetAggregationMode in operation S713. The first media server 710 recognizes that the third media server 750 can perform a content information aggregation function but does not currently perform the content information aggregation function and can be controlled by another aggregation available media server, on the basis of the allowed value of the AggregationMode transmitted from the third media server 750.

The first media server 710 transmits a GetAggregationMode to the fourth media server 770 in operation S715. The fourth media server 770 transmits the AggregationMode having the allowed value of '2' to the first media server 710 in response to the GetAggregationMode in operation S717. The first media server 710 recognizes that the fourth media server 770 can perform a content information aggregation function but does not currently perform the content information aggregation function and cannot be controlled by another aggregation available media server, on the basis of the allowed value of the AggregationMode transmitted from the fourth media server 770.

The first media server 710 transmits a GetAggregationMode to the fifth media server 790 in operation S719. The fifth media server 790 transmits the AggregationMode having the allowed value of '3' to the first media server 710 in response to the GetAggregationMode in operation S721. The first media server 710 recognizes that the fifth media server 790 performs a current content information aggregation function and cannot be controlled by another aggregation available media server, on the basis of the allowed value of the AggregationMode transmitted from the fifth media server 790.

Then, the first media server 710 starts a negotiation procedure with the second media server 730 that can be controlled by another media server among the second media server 730 and the fifth media server 790, which are AMSs currently performing an aggregation function in operation S723. The first media server 710 may start a negotiation to set at least one among a plurality of media servers as an AMS, on the basis of information on an aggregation mode collected from each of a plurality of media servers. The negotiation procedure may be a procedure starting between media servers that can be controlled by another media server and a negotiation media server.

Then, on the basis of the negotiation result, when the first media server 710 among the first media server 710 and the second media server 730 is set as an AMS in operation S725, the first media server 710 deactivates the aggregation function of the second media server 730 while activating the aggregation function of the first media server 710. The first media server 710 transmits a SetAggregationMode including AggregationMode=0 having the data type of '0' to the second media server 730 in order to deactivate the aggregation function of the second media server 730 in operation S727. Additionally, the first media server 710 deactivates a negotiation function while activating the aggregation function of the first media server 710 in operation S735. The aggregation function activation and negotiation function deactivation of the first media server 710 may be simultaneously completed, but are not limited thereto. Operations S727 and S735 may be performed simultaneously, but are not limited thereto. Accordingly, the first media server 710 performs the aggregation function in operation S737.

Additionally, the first media server 710 transmits a SetNegotiationMode including a NegotiationMode having the allowed value of '1' to the second media server 730 in operation S729. The first media server 710 itself becomes an AMS, and hands over a negotiation media server role to the second media server 730.

The properties of a negotiation mode state variable may include a state variable name, an event, a data type, an allowed value, and a default value, and are not limited thereto. The state variable name is a NegotiationMode. An event is possible, and an AMS may recognize whether a negotiation media server exists in a corresponding network through an event including a negotiation mode state variable. The data type may be a Boolean type or a string type. When the data type is a Boolean type, an allowed value may be '0' or '1'. When the allowed value is '0', it means that a corresponding media server is not a negotiation media server, and when the allowed value is '1', it means that a corresponding media server is a negotiation media server. When the data type is a string type, the allowed value may be a 'negotiator' or a 'Not_a_Negotiator'. With the default value is '1', when an aggregation available media server joins one network, it may start an aggregation procedure, but is not limited thereto.

The properties of the SetNegotiationMode may include an action name and arguments, and are not limited thereto. The action name may be a SetAggregationMode. The argument, as a variable corresponding to a command, may include an argument name, an argument direction, and a related state variable, and is not limited thereto. The name of an argument corresponding to a SetAggregationMode may be a NegotiationMode; the transmission direction may be defined as IN; and the first media server 710 transmitting a SetNegotiationMode is a subject transmitting a negotiation mode state variable. The related state variable may be a NegotiationMode.

Then, the second media server 730 receiving the SetAggregationMode including the AggregationMode having the value of '0' and the SetAggregationMode including a negotiation mode state variable having the value of '1' activates a negotiation function while deactivating an aggregation function in operation S731. The deactivation of an aggregation function and the activation of a negotiation function may be performed simultaneously, but are not limited thereto. Accordingly, the second media server 730 stops performing the aggregation function in operation S733. The second media server 730 may restart a negotiation procedure as a negotiation media server in order to set a new AMS, when there is no AMS, for example, when the network connection of the first media server 710 performing a current aggregation function is interrupted.

Next, referring to FIG. 8, when a network access of a negotiation media server is released without an additional notification, a method of setting a new negotiation media server will be described.

Figure 8:
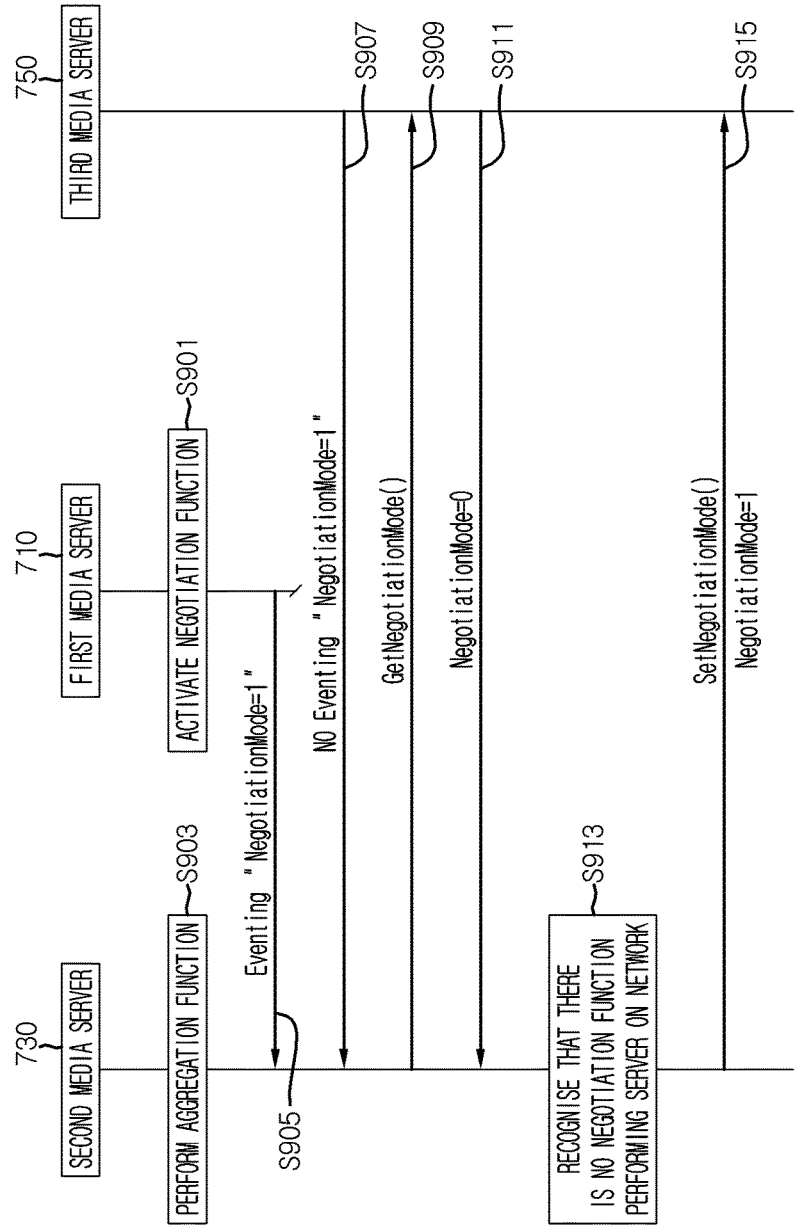
FIG. 8 is a flowchart illustrating a method of setting a negotiation media server according to an embodiment of the present invention.

FIG. 8 is a flowchart illustrating a method of setting a negotiation media server according to an embodiment of the present invention.

Referring to FIG. 8, the first media server 710 activates a negotiation function in operation S901. The first media server 710 may perform the role of a current negotiation media server in one network.

The first media server 710, as a negotiation media server, transmits an event message including a negotiation mode state variable having the allowed value of '1' to the second media server 730 in operation S905, which is an AMS performing a current aggregation function in operation S903. The second media server 730, which receives an event message including the negotiation mode state variable having the allowed value of '1', recognizes that the first media server 710 is a negotiation media server.

Then, the network access release occurs without handing a notification or a role of a negotiation media server over from the first media server 710 to another media server.

The second media server 730, i.e. an AMS, may confirm whether a negotiation media server exists in a network. Unlike the above-mentioned event message of the first media server, when the third media server 750, i.e. another media server existing in the same network, does not transmit any event message including a negotiation mode state variable with a specific allowed value in operation S907, the second media server 730 transmits a GetNegotiationMode to the third media server 750 in operation S909.

The properties of the GetNegotiationMode may include an action name and arguments, and are not limited thereto. The action name may be a GetNegotiationMode. The argument, as a variable corresponding to a command, may include an argument name, an argument direction, and a related state variable, and is not limited thereto. The argument name corresponding to the GetNegotiationMode may be a NegotiationMode. The argument, that is, the transmission direction of a negotiation mode state variable, may be defined as OUT, and a negotiation mode state variable of the third media server 750, for example, a target receiving a GetNegotiationMode, may be a target argument. The related state variable may be a NegotiationMode.

The third media server 750 transmits the negotiation mode state variable having the allowed value of '0' to the second media server 730 in response to the GetNegotiationMode in operation S911.

The second media server 730, which does not receive an event message or response message including a negotiation mode state variable having the allowed value of '1' from a media server in a network, recognizes the absence of a negotiation media server, i.e. a server performing a negotiation function on a corresponding network, in operation S913.

Additionally, the second media server 730, which recognizes the absence of a negotiation media server on a network, transmits a SetNegotiationMode including a negotiation mode state variable having the allowed value of '1' to the third media server 750 in operation S915.

The third media server 750, which receives the SetNegotiationMode including the negotiation mode state variable having the allowed value of '1', may become a new negotiation media server.

Next, referring to FIGS. 9 to 11, the standard on setting an AMS during a negotiation procedure will be described.

Figure 9:
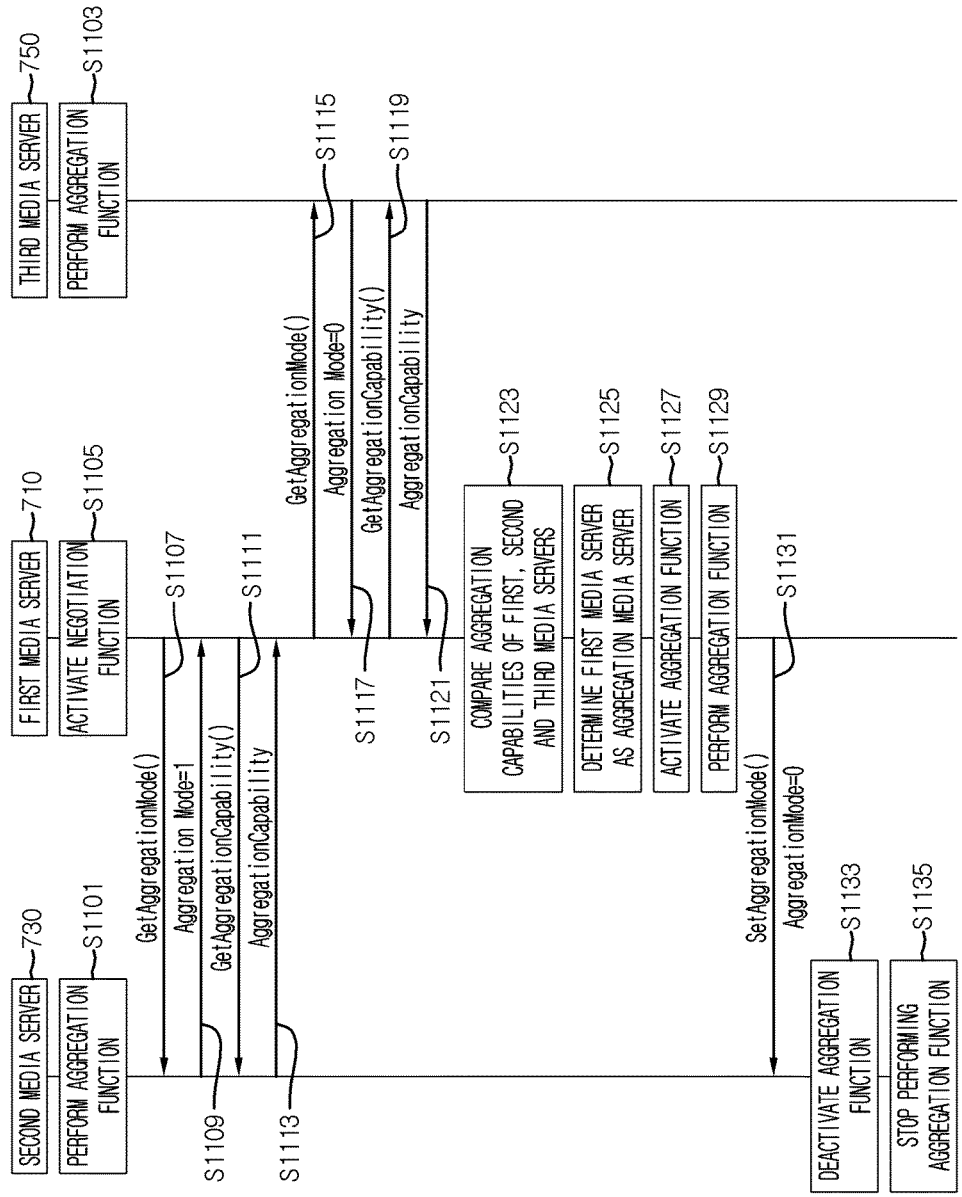
FIG. 9 is a flowchart illustrating a standard of setting an AMS by a negotiation media server according to an embodiment of the present invention.

FIG. 9 is a flowchart illustrating the standard on setting an AMS by a negotiation media server according to an embodiment of the present invention.

Referring to FIG. 9, each of a second media server 730 and a third media server 750 in one network is an AMS performing an aggregation function in operations S1101 and S1103.

When newly joining a network including the second media server 730 and the third media server 750, the first media server 710 becomes a negotiation media server to activate the negotiation function of the first media server 710 in operation S1105. In order to evade unnecessary network traffic occurring when a plurality of aggregation available media server or AMSs exist in one network, one or only at least aggregation available media server needs to perform an aggregation function, and since other aggregation available media servers do not need to perform an aggregation function, they are enough to serve as general media servers. Accordingly, for example, in order to specify one aggregation available media server and perform an aggregation function, a negotiation media server may collect information on aggregation capability of a plurality of aggregation available media servers.

The negotiation function activated first media server 710 transmits a GetAggregationMode to the second media server 730 in operation S1107. The second media server 730 transmits an AggregationMode having the data type of '1' in response to the GetAggregationMode transmitted from the first media server 710 in operation S1109.

Then, the first media server 710 transmits a GetAggregationCapability to the second media server 730 in operation S1111. The second media server 730 transmits an AggregationCapability in response to the GetAggregationCapability transmitted from the first media server 710 in operation S1113.

Additionally, the first media server 710 transmits a GetAggregationMode to the third media server 750 in operation S1115. The third media server 750 transmits an AggregationMode having the data type of '0' in response to the GetAggregationMode transmitted from the first media server 710 in operation S1117.

Then, the first media server 710 transmits a GetAggregationCapability to the third media server 750 in operation S1119. The third media server 750 transmits an AggregationCapability in response to the GetAggregationCapability transmitted from the first media server 710 in operation S1121.

Thus, the first media server 710 may recognize that the second media server 730 and the third media server 750 perform an aggregation function in one network through the GetAggregationMode. Accordingly, aggregation available media servers, for example, the first media server 710, the second media server 730, and the third media server 750, need to share information on capabilities and resources of a necessarily and beneficially required media server. It is necessary to define which properties are necessarily and beneficially required capability and resource among device properties of a media server.

The properties of the GetAggregationCapability may include an action name and arguments, and are not limited thereto. The action name may be a GetAggregationCapability. The argument may include an argument name, an argument direction, and a related state variable, and is not limited thereto. The argument name corresponding to a GetAggregationCapability may be an AggregationCapability, and the transmission direction of an AggregationCapability may be defined as OUT. The related state variable may be an AggregationCapability.

The properties of an AggregationCapability may include a state variable name, an event, a data type, and an allowed value, and are not limited thereto. The state variable name may be an AggregationCapability. An event may or may not be possible. Additionally, the data type may be a string type. The allowed value may be a list format that represents several values, for example, a Comma Separated Value list (CSV). The state variable of the 'CSV' type may include a plurality of properties. Each data type may be determined by device properties. Hereinafter, referring to FIGS. 10 and 11, information that is to be included in an AggregationCapability will be described.

FIG. 10 is a view illustrating an AMS setting standard according to an embodiment of the present invention.

Referring to FIG. 10, the AggregationCapability according to an embodiment of the present invention includes information on device properties such as a Total Storage Size, a Free Storage Size, a Memory, a CPU, an XML Parsing Capability, a Transforming Capability, a Connectivity & Transfer protocol, The number of stored content, a Device Type, and an Aggregation Mode but is not limited thereto.

The total storage size and the free storage size may be the basis of determining an amount of content metadata that a corresponding media server collects in one network.

The memory may be the basis of determining an amount of content metadata that a corresponding media server handles in one network.

The CPU performance relates to the data management and calculation of a corresponding media server.

Since the metadata is expressed in an XML, the XML parsing capability becomes an important factor, and grade information according to the XML parsing capability is required.

Since an aggregation available media server may change content instead of a media server including actual corresponding content, the Transforming Capability becomes an important property, and the number of file formats that a corresponding media server changes becomes information for describing the transforming capability.

The Connectivity & Transfer protocol may be the basis of determining an amount of data that a corresponding media server transmits to another media server or control point device, and grade information according to the Connectivity & Transfer protocol is required. For example, the higher the grade of the Connectivity & Transfer protocol of a device implemented with Ethernet is better, and when the grade of the Connectivity & Transfer protocol of a device implemented with Bluetooth is low, it is fine.

In relation to the number of stored content, since an aggregation available media server is a server for collecting content metadata from another media server, an aggregation available media server storing a larger number of content metadata needs to collect a less number of content metadata from another media server.

Since it is better for a media server, which accesses a corresponding network longer, to perform an aggregation function, a device type grade is necessary. For example, a device type grade of a mobile device is low, and a device of a high performance such as a PC and a device powered up permanently (or semi-permanently) such as a server attached to a network have a high device type grade.

Since it is convenient for a media server performing a current aggregation function to perform an aggregation function continuously, information on an aggregation mode is necessary.

In operation S1113 of FIG. 9, the second media server 730 may transmit to the first media server 710 the aggregation capability state information including information on the total storage size (500 MB), free storage size (100 MB), memory (2 GB), CPU (2.53 GHz), XML parsing capability (Grade 1), transforming capability (13), Connectivity & Transfer protocol (Grade 2), number of stored content (204), device type (Grade 4), and aggregation mode (ON) of the second media server 730.

In operation S1121 of FIG. 9, the third media server 750 may transmit to the first media server 710 the aggregation capability state information including information on the total storage size (100 MB), free storage size (20 MB), memory (1 GB), CPU (1 GHz), XML parsing capability (Grade 3), transforming capability (0), Connectivity & Transfer protocol (Grade 1), number of stored content (564), device type (Grade 1), and aggregation mode (OFF) of the third media server 750.

Figures 11, 12:
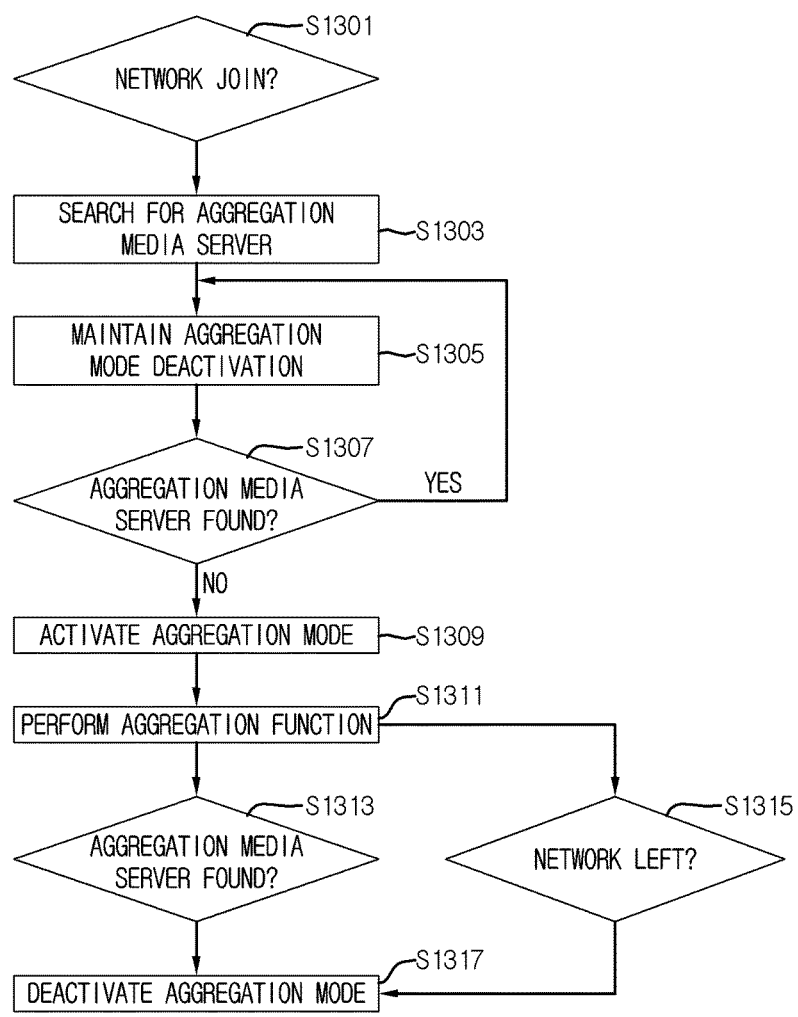
FIG. 11 is a view illustrating an AMS setting standard according to another embodiment of the present invention.
FIG. 12 is a flowchart illustrating a state change of an aggregation mode of a media server supporting a content information aggregation function according to an embodiment of the present invention.

FIG. 11 is a view illustrating an AMS setting standard according to another embodiment of the present invention.

Referring to FIG. 11, the AggregationCapability according to another embodiment of the present invention includes one value for indicating an aggregation capability grade instead of notifying each of all properties of a corresponding device. Each of a plurality of aggregation available media servers may translate many types of device properties that each has as a grade evaluated with a single integer through a translation rule.

The properties of the AggregationCapability according to another embodiment of the present invention may include a state variable name, an event, a data type, an allowed value, and an allowed value range, and are not limited thereto. The state variable name may be an AggregationCapability. An event may or may not be possible. Additionally, the data type may be a ui4 type. The allowed value may be all integers from '0' to 'M', and 'M' represents the maximum grade. The allowed value range may be between '0' and 'M', and when compared more elaborately, the maximum value may be increased.

In operation S1113 of FIG. 9, the second media server 730 may transmit aggregation capability state information having the allowed value of '3' to the first media server 710.

In operation S1121 of FIG. 9, the third media server 750 may transmit aggregation capability state information having the allowed value of '4' to the first media server 710.

Again, FIG. 9 will be described.

Before, as described with reference to FIGS. 10 and 11, the first media server 710 receives aggregation capability state information transmitted from each of the second media server 730 and the third media server 750, and then compares the aggregation capabilities of the first media server 710, the second media server 730, and the third media server 750 in order to determine a server to become an AMS in operation S1123.

Then, the first media server 710 compares the aggregation capabilities of the first media server 710, the second media server 730, and the third media server 750 and then sets the first media server 710 as an AMS on the bases of a comparison result in operation S1125.

For example, when FIG. 10 is described again, the first media server 710 compares the device properties of the first media server 710, the second media server 730, and the third media server 750 and then ranks them in order to set a media server having the smallest sum of all ranks of each property as an AMS. In FIG. 10, the first media server 710 transmits a GetAggregationCapability to each of the second media server 730 and the third media server 750, and receives an AggregationCapability corresponding thereto in order to collect information on each device property. The first media server 710 compares and ranks each device property and then, adds up the ranks. On the basis of the rank sum result, the rank sum of the first media server 710 is 16; the rank sum of the second media server 730 is 19; and the rank sum of the third media server 750 is 23. Therefore, the first media server 710 having the smallest rank sum may be set as a media server having the most excellent aggregation capability. A method of determining a rank is not limited thereto.

As another example, as described again with reference to FIG. 11, the first media server 710 may receive an AggregationCapability calculated with one grade from each of the second media server 730 and the third media server 750. The first media server 710 compares the received grade of the AggregationCapability with the grade of the Aggregation-Capability of the first media server 710 and then sets the first media server 710 having the smallest grade number as an AMS.

If the first media server 710 set as an AMS has the AggregationMode value of '0', it changes the Aggregation-Mode value into '1' to activate an aggregation function in operation S1127. The aggregation function activated first media server 710 performs an aggregation function in operation S1129.

Then, the first media server 710 transmits to the second media server 730 the SetAggregationMode including AggregationMode=0 in operation S1131.

The second media server 730 deactivates an aggregation function, for example, by changing the data value of the AggregationMode of the second media server 730 from '1' into '0' in operation S1133. The aggregation function deactivated second media server 730 stops performing an aggregation function in operation S1135.

Then, a process of changing a state of a media server supporting a content information aggregation function into an aggregation available media server and an AMS will be described.

FIG. 12 is a flowchart illustrating a state change of an aggregation mode of a media server supporting a content information aggregation function according to an embodiment of the present invention.

Referring to FIG. 12, when an aggregation available media server supporting a content information aggregation function joins a network in operation S1301, an AMS is searched periodically in order to determine whether there is an AMS among media servers in a corresponding network in operation S1303. At this point, an aggregation available media server may operate as a negotiation media server. In order to search for an AMS, the aggregation available media server may use the above-mentioned GetAggregationMode, or may receive an event message including information on an aggregation mode state transmitted from another aggregation media server or another AMS, and is not limited thereto.

Until it is determined that all media servers in a corresponding network do not perform an aggregation function, that is, until an AMS search is completed, the aggregation available media server maintains an aggregation mode deactivation state in operation S1305.

When an AMS is found in operation S1307, the aggregation available media server maintains the aggregation mode deactivation state, and when an AMS is not found in operation S1307, the aggregation available media server activates the aggregation mode thereof in operation S1309. Additionally, when an AMS is found, the aggregation available media server, as a negotiation media server, compares the aggregation capabilities of a plurality of AMSs, and sets a media server having the most excellent aggregation capability as an AMS. The aggregation available media server may set its AggregationMode value to '1' in order to activate its aggregation mode, but is not limited thereto.

When the aggregation mode is activated, the aggregation available media server performs the aggregation function in operation S1311. For example, the aggregation available media server may become an AMS, and the AMS may collect content metadata stored in a media server in a state that can be controlled by another media server among media servers in a corresponding network.

When another AMS is found in a corresponding network in operation S1313, the AMS deactivates its aggregation mode in operation S1317. Or, the AMS leaves the corresponding network in operation S1315, and after the access is disconnected, deactivates its aggregation mode in operation S1317.

Thus, even when there is no additional control device instruction in a network, since at least one media server collects information stored in a plurality of media servers in a network, a control device may receive information that the plurality of media servers store by requesting information once to one media server.

Moreover, in order for a media server or a control device to select a specific object among aggregate objects stored in an aggregation media server, each of a plurality of content metadata stored in the aggregation media server may need to be distinguished according to the type of a media server where the content metadata are originally stored. Hereinafter, referring to FIGS. 13 to 15, a method of distinguishing content metadata collected and stored in an aggregation media server will be described.

Figure 13:
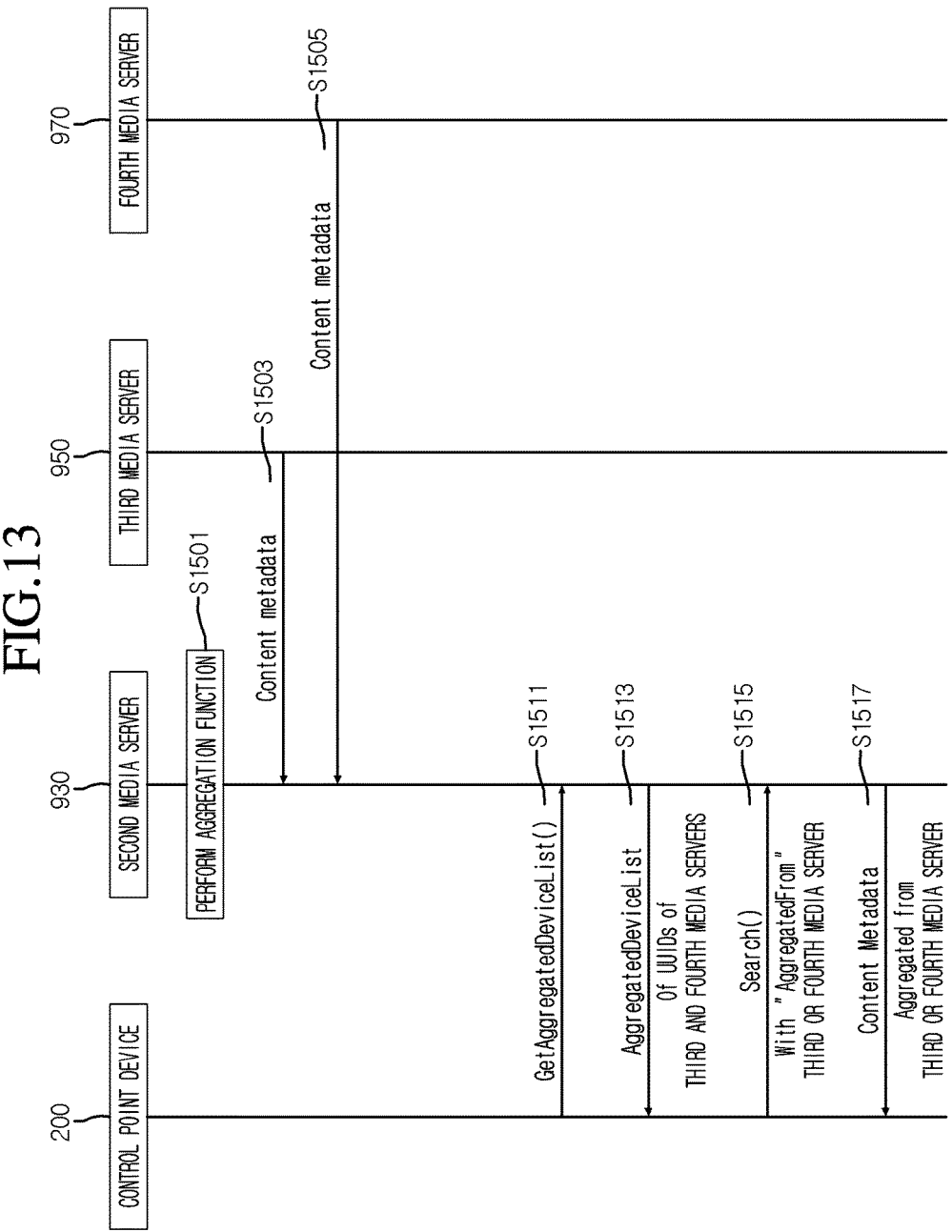
FIG. 13 is a flowchart illustrating a content information aggregation operation of a media server according to an embodiment of the present invention.

FIG. 13 is a flowchart illustrating a content information aggregation operation of a media server according to an embodiment of the present invention.

Referring to FIG. 13, the second media server 930, as an AMS, performs an aggregation function in operation S1501. The second media server 930 receives content metadata from a third media server 950 or a fourth media server 970, i.e. an ADMS, in order to perform an aggregation function in operations S1503 and S1505.

Then, a control point device 200 transmits an aggregated device list obtaining action (GetAggregatedDeviceList( )) to the second media server 930 in operation S1511. The control point device 200 may transmit a GetAggregatedDeviceList ( ) to the control point device 200, i.e. an AMS, in order to know that the content metadata that the second media server 930 collects are collected from which device. In order to prevent unnecessary network traffic resulting from a plurality of AMSs in one network, it is necessary to distinguish collected content metadata from uncollected content metadata among the content metadata stored in the AMSs. The uncollected content metadata may refer to content metadata generated by an AMS or originally stored in a corresponding AMS. Hereinafter, locally stored content may be used with the same meaning as uncollected content.

A new CDS property needs to be defined in order to distinguish such content metadata. The new CDS property may include a property name, a data type, a multi-value, and Read/Write (R/W), but is not limited thereto. The property name may be an Aggregated. The data type may be a Boolean type or a string type. In the case that the data type is a Boolean type, if the value of the data type is '0', corresponding content metadata may mean the metadata of content locally stored in an AMS. If the value of the data type is '1', corresponding content metadata may mean content metadata that an AMS collects from another media server. When the data type is a string type, the value of the data type may be 'Local' or 'Aggregated'. A corresponding property may not be necessarily a multi-value, but is not limited thereto. R/W allows read and write, but is not limited thereto.

Furthermore, the above mentioned new CDS property may indicate that a media server, for example, an original media server, from which an AMS collects content metadata, is which media server.

In order to distinguish an original media server where content metadata are collected, a new CDS property may be defined. The new CDS property may include a property name, a data type, a multi-value, and R/W, but is not limited thereto. The property name may be an AggregatedFrom or may be an original server device identifier (originalServerUDN). The data type may be a string type. If the data type is a string type, the value of the data type may indicate a Unique Device Name (UDN) of a media server. A corresponding property may not be necessarily a multi-value, but is not limited thereto. R/W allows read and write, but is not limited thereto. Moreover, a property value for content metadata stored locally may be a UDN of a corresponding local or left as empty, but is not limited thereto.

Additionally, information on where the content metadata stored in an AMS come from needs to be shared with other ACMSs or control devices. In order for information sharing, a state variable and action need to be defined.

Information on the origin of the content metadata stored in an AMS may be obtained through a state variable. The state variable may include a state variable name, an event, a data type, an allowed value, and a default value, but is not limited thereto. The state variable name may be an AggregatedDeviceList or an A_ARG_TYPE_AggregatedDeviceList. An event may or may not be possible. The data type is a string type, and may indicate the UDN of a media server that is an origin from which an AMS collects content metadata. The allowed value may be 'CSV'. Since the state variable may include a plurality of UDNs, an allowed value may be a 'CSV' type, but is not limited thereto. The default value doesn't need to be defined.

Additionally, Information on the origin of the content metadata stored in an AMS may be obtained through an action. For example, the GetAggregatedDeviceList may be a control command for obtaining a list including identifiers of aggregated devices such as ADMSs, i.e. a target from which an AMS collects content metadata. The aggregated list obtaining action may include an action name, arguments, related state variables, and error code. The action name may be a GetAggregatedDeviceList. The argument name may be an AggregatedDeviceList, and the argument direction may be OUT. The related state variable may be an AggregatedDeviceList or an A_ARG_TYPE_AggregatedDeviceList. The error code may include 742. The error code including 742 may mean an unsupported action. For example when the error code is 742, since a requested action such as GetAggregatedDeviceList is supported only when a value of an AggregationMode is '1', so that it means that an action requested when a value of a current state variable is '0' is not supported.

The second media server 930 transmits a response including an AggregatedDeviceList state variable to the control point device 200 in response to the GetAggregatedDeviceList in operation S1513. At this point, the AggregatedDeviceList state variable may include Universally Unique Identifier (UDN) information on each of the third media server 950 and the fourth media server 970, which are the ADMSs of the second media server 930.

Then, a control point device 200 transmits a search request including AggregatedFrom information to the second media server 930 in operation S1515. At this point, the control point device 200 may specify the third media server 950 or the fourth media server 970 in the AggregatedFrom information.

In response to the search request, the second media server 930 transmits content metadata to the control point device 200 in operation S1517. At this point, the second media server 930 may distinguish content metadata collected from the third media server 950 or the fourth media server 970 among the content metadata stored in the second media server 930, and then may transmit them to the control point device 200.

Thus, when requesting content metadata to an AMS in the same network, a media server may distinguish whether content metadata are locally stored in an AMS or are collected by an AMS by using a GetAggregatedDeviceList, an AggregatedDeviceList state variable, an aggregated origin property, and an aggregated property, and in the case that the AMS collects the content metadata, its origin is distinguished so that the media server may selectively receive only the content metadata stored in a specific media server.

Hereinafter, in the case that an AMS is changed or overlapped, when a new AMS receives content information from a previous AMS, a method of distinguishing only necessary content information by using the above described action, state variable, and information property and receiving it will be described with reference to FIGS. 14 and 15. At this point, the same part described with reference to FIG. 13 will be omitted.

Figure 14:
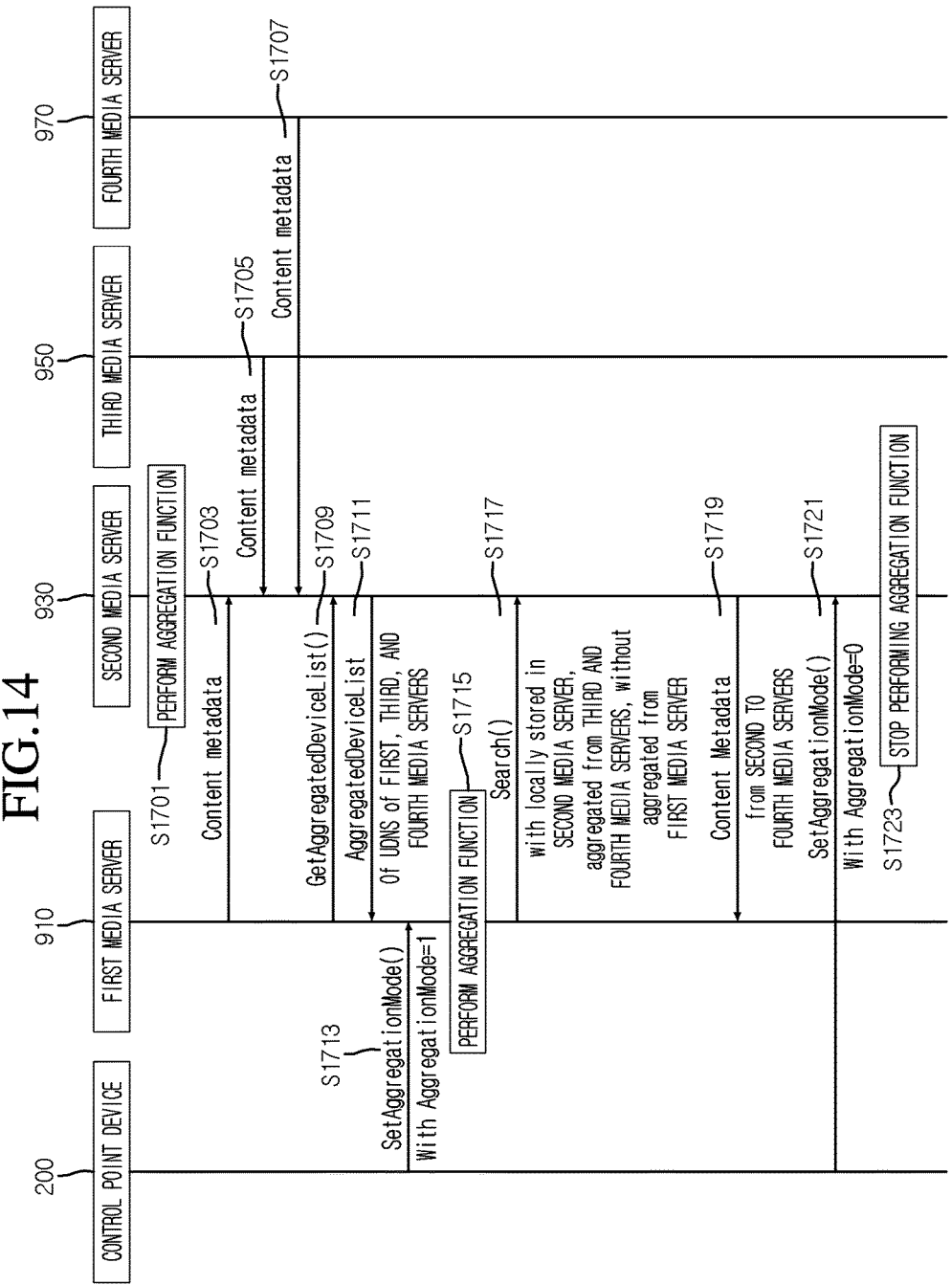
FIG. 14 is a flowchart illustrating a method of receiving content information from a previous AMS through properties that a new AMS uses to distinguish content information according to an embodiment of the present invention.

FIG. 14 is a flowchart illustrating a method of receiving content information from a previous AMS through properties that a new AMS uses to distinguish content information according to an embodiment of the present invention.

Referring to FIG. 14, the second media server 930, as an AMS, performs an aggregation function in operation 1701, and receive content metadata from a media server in the same network, for example, each of the first media server, the third media server 950, and the fourth media server 970, in operations S1703, S1705, and S1707.

Then, when the first media server 910 requests the GetAggregatedDeviceList to the second media server 930 in operation S1709, the second media server 930 transmits to the first media server 910 an AggregatedDeviceList state variable including the UDNs of the first media server 910, the third media server 950, and the fourth media server 970 in response to the request in operation S1711.

Then, the control point device 200 transmits to the first media server 910 the SetAggregationMode ( ), which includes an aggregation mode state variable having the value of '1', i.e. AggregationMode=1, in operation S1713, and then starts the aggregation function performance of the first media server 910 in operation S1715. At this point, the a media server in the same network in addition to the control point device 200 may control the aggregation function of the first media server 910 and the second media server 930, but is not limited thereto.

The first media server 910 requests specific content metadata to the second media server 930 in operation S1717. When requesting the content metadata, the first media server 910 may specify the content metadata locally stored in the second media server 930 and the content metadata collected from each of the third media server 950 and the fourth media server 970, and then, may request them. The first media server 910, as a media server that becomes an AMS instead of the second media server 930, receives the content metadata that the second media server 930 previously collects, so that it does not need to collect the content metadata again. However, since the first media server 910 does not need to collect again the content metadata that the second media server previously collects from the first media server 910, when specifying the content metadata, the content metadata collected from the first media server 910 may be excluded.

In response to the request from the first media server 910 in operation S1721, the second media server 930 may transmit to the first media server 910 the content metadata locally stored in the second media server 930 and the content metadata collected from each of the third media server 950 and the fourth media server 970 in operation S1719.

Then, the control point device 200 transmits to the second media server 930 the SetAggregationMode ( ), which includes an aggregation mode state variable having the value of '0', i.e. AggregationMode=0, in operation S1721, and then stops the aggregation function performance of the second media server 930 in operation S1723.

Figure 15:
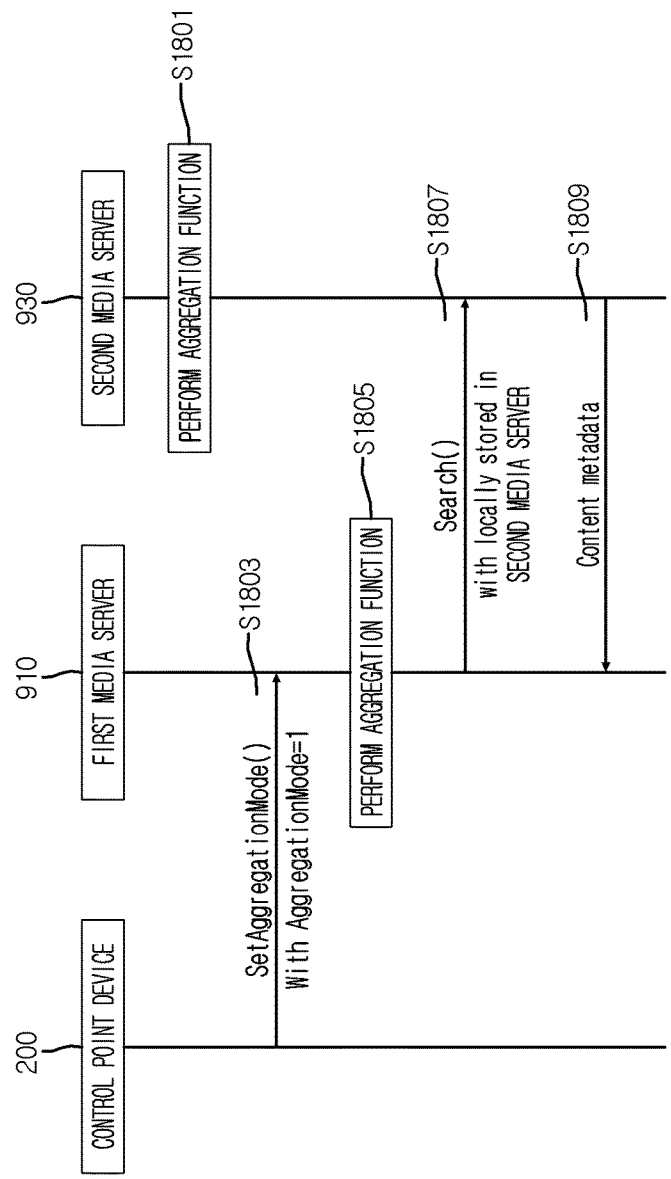
FIG. 15 is a flowchart illustrating a method of receiving content information from a previous AMS through properties that a new AMS uses to distinguish content information according to another embodiment of the present invention.

FIG. 15 is a flowchart illustrating a method of receiving content information from a previous AMS through properties that a new AMS uses to distinguish content information according to another embodiment of the present invention.

While the second media server 930, as an AMS, performs an aggregation function in operation S1801, when the control point device 200 transmits to the first media server 910 the SetAggregationMode ( ), which includes an aggregation mode state variable having the value of '1', i.e. AggregationMode=1, in operation S1803, the first media server 910 also performs an aggregation function in the same network as the second media server 930 in operation S1805.

The first media server 910 that becomes an AMS transmits to the second media server 930 a search request (Search( ) with locally stored in the second media server) in order to obtain specific content metadata in operation S1807.

Then, the second media server 930 transmits specific content metadata to the first media server 910 in operation S1809 in response to the search request in operation S1807.

The specific content metadata may be locally stored in the second media server 830. Thus, if aggregation media exist redundantly in the first media server 910 and the second media server 930 on the same network, since the second media server 930 already collects and stores content metadata of another media server through an aggregation function, in order to prevent the content metadata of another media server from being redundant, the first media server 910 may collect only the content metadata locally stored in the second media server 930, instead of the content metadata that the second media server 930 collects to perform an aggregation function.

Hereinafter, referring to FIGS. 16 and 17, a method of assigning an identifier to the content metadata that an AMS collects and, when an update of corresponding content metadata is executed on an ADMS after content metadata are collected, reflecting this will be described.

Figure 16:
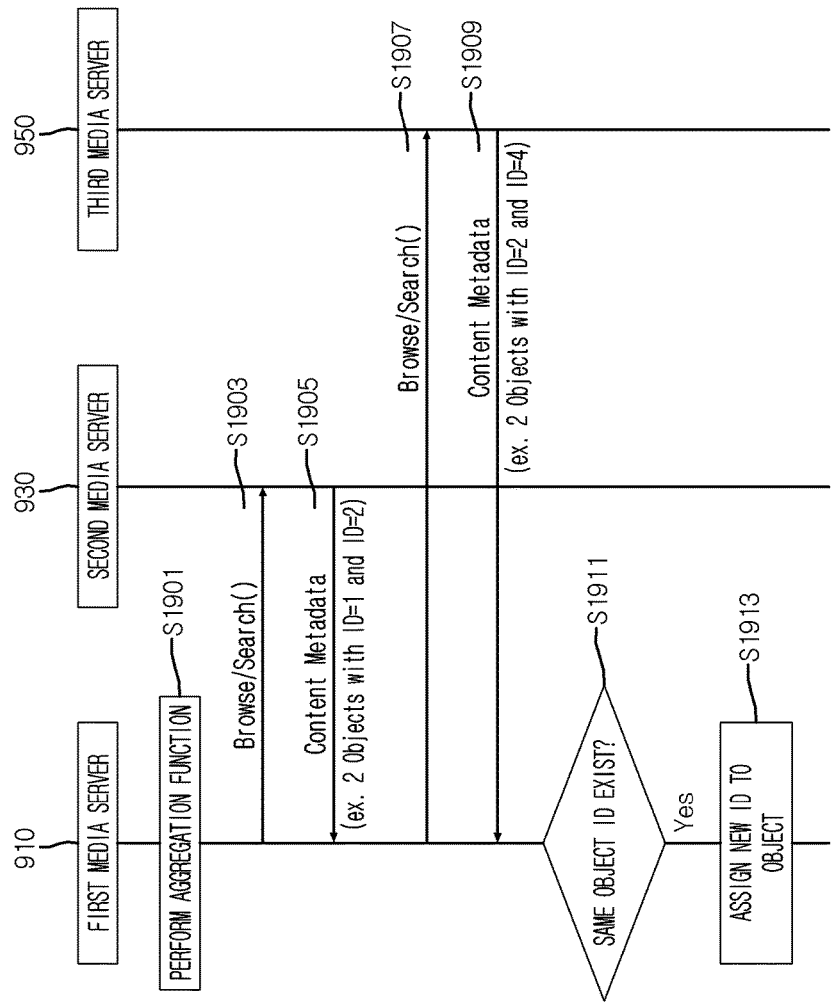
FIG. 16 is a flowchart illustrating a process of assigning an identifier to a content object that an AMS collects from a media server according to an embodiment of the present invention.

FIG. 16 is a flowchart illustrating a process of assigning an identifier to a content object that an AMS collects from a media server according to an embodiment of the present invention.

Referring to FIG. 16, the first media server 910, as an AMS, performs an aggregation function in operation S1901. Additionally, the first media server 910 transmits a browse/search request (Browse/Search( )) to the second media server 930 in operation S1903, and receives the content metadata transmitted from the second media server 930 in operation S1905. The content metadata transmitted from the second media server 930 may include two content objects, whose object IDs are '1' and '2', respectively.

Additionally, the first media server 910 transmits a browse/search request (Browse/Search( )) to the third media server 950 in operation S1907, and receives the content metadata transmitted from the third media server 950 in operation S1909. The content metadata transmitted from the third media server 950 may include two content objects, whose object IDs are '2' and '4', respectively.

All media contents need to be distinguished from each other by a unique identifier. The unique identifier may be allocated by a media server including corresponding media content, and accordingly, the uniqueness of media content may be maintained only in a single media server.

Moreover, an AMS generally collects a plurality of media contents from a plurality of different media servers, not from one media server. Therefore, the uniqueness that the identifier of media content means, which is collected by an AMS, may not be maintained any more. Since the content metadata collected in operation S1905 includes a content object having the object ID of '1' and a content object having the object ID of '2', and the content metadata collected in operation S1909 includes a content object having the object ID of '2' and a content object having the object ID of '4', the object ID of '2' is redundant. Therefore, a content object cannot be distinguished only with the object ID of '2'.

In such a case, the first media server 910 determines whether there is the same object ID in operation S1911 by comparing each of identifiers of a plurality of content metadata, i.e. each object ID.

If there is a redundant object ID, the first media server 910 allocates a new ID to a redundant object, i.e. content metadata, in operation S1913. That is, an AMS needs to allocate a unique identifier to an aggregate media content, and the allocated new identifier needs to be stored according to a new type of metadata of the aggregated media content.

An identifier that the AMS newly allocates may be defined as a new CDS property. The new CDS property may include a property name, a data type, a multi-value, and R/W, but is not limited thereto. The property name may include an object ID (ObjectID) and "@id" may be reused, but the present invention is not limited thereto. The data type may be 'ui4' or a string type. The 'ui4' data type means that data is an integer. A corresponding property may not be necessarily a multi-value, but is not limited thereto. R/W is read only, but is not limited thereto.

For example, an AMS may respectively allocate the identifier of '1' and the identifier of '2' to the object ID of '1' and the object ID of '2' collected from the second media server 930. Additionally, an AMS may respectively allocate the identifier of '3' and the identifier of '4' to the object ID of '2' and the object ID of '4' collected from the third media server 950. As a result, since all content metadata on an AMS have different identifiers, they may be distinguished from each other.

Additionally, an identifier that the AMS newly allocates according to another embodiment of the present invention may be defined as another new CDS property. The CDS property may include a property name, a data type, a multi-value, and R/W, but is not limited thereto. The property name may include an original object ID (OriginalObjectID), an aggregation ID (@aggID), or an aggregated object ID (aggregatedObjectID), but is not limited thereto. The data type may be 'ui4' or a string type. The 'ui4' data type means that data is an integer. A corresponding property may not be necessarily a multi-value, but is not limited thereto. R/W is read only, but is not limited thereto.

Additionally, an identifier that the AMS newly allocates according to another embodiment of the present invention may be defined as another new CDS property. The CDS property may include a property name, a data type, a multi-value, and R/W, but is not limited thereto. The property name may include an aggregation ID (@aggID), but is not limited thereto. The data type may be a CSV type. The CSV type, whose data type is an integer, may mean a list of values of an original object's ID and an original media server's UDN. A corresponding property may not be necessarily a multi-value, but is not limited thereto. R/W is read only, but is not limited thereto.

For example, an AMS may allocate the object ID of '1' (ObjectID=1), an aggregated object ID of '1' (aggregatedObjectID=1), and an origin server UDN of 'aab3' (OriginalServerUDN=aab3) to an object having the object ID of '1' collected from the second media server 930. Additionally, an AMS may allocate the object ID of '2' (ObjectID=2), an aggregated object ID of '2' (aggregatedObjectID=2), and an origin server UDN of 'aab3' (OriginalServerUDN=aab3) to an object having the object ID of '2' collected from the second media server 930. An AMS may allocate at least one of the object ID of '3' (ObjectID=3), an aggregated object ID of '2' (aggregatedObjectID=2), and an origin server UDN of '78wq' (OriginalServerUDN=78wq) to an object having the object ID of '2' collected from the third media server 950. Moreover, an AMS may allocate the object ID of '4' (ObjectID=4), an aggregated object ID of '4' (aggregatedObjectID=4), and an origin server UDN of '78wq' (OriginalServerUDN=78wq) to an object having the object ID of '4' collected from the third media server 950. As result, all content metadata collected and stored in an AMS may be distinguished as different objects with an object ID, an original identifier assigned by an ADMS may be distinguished with an aggregated object ID, and an origin of an object may be distinguished using an origin server UDN.

Figure 17:
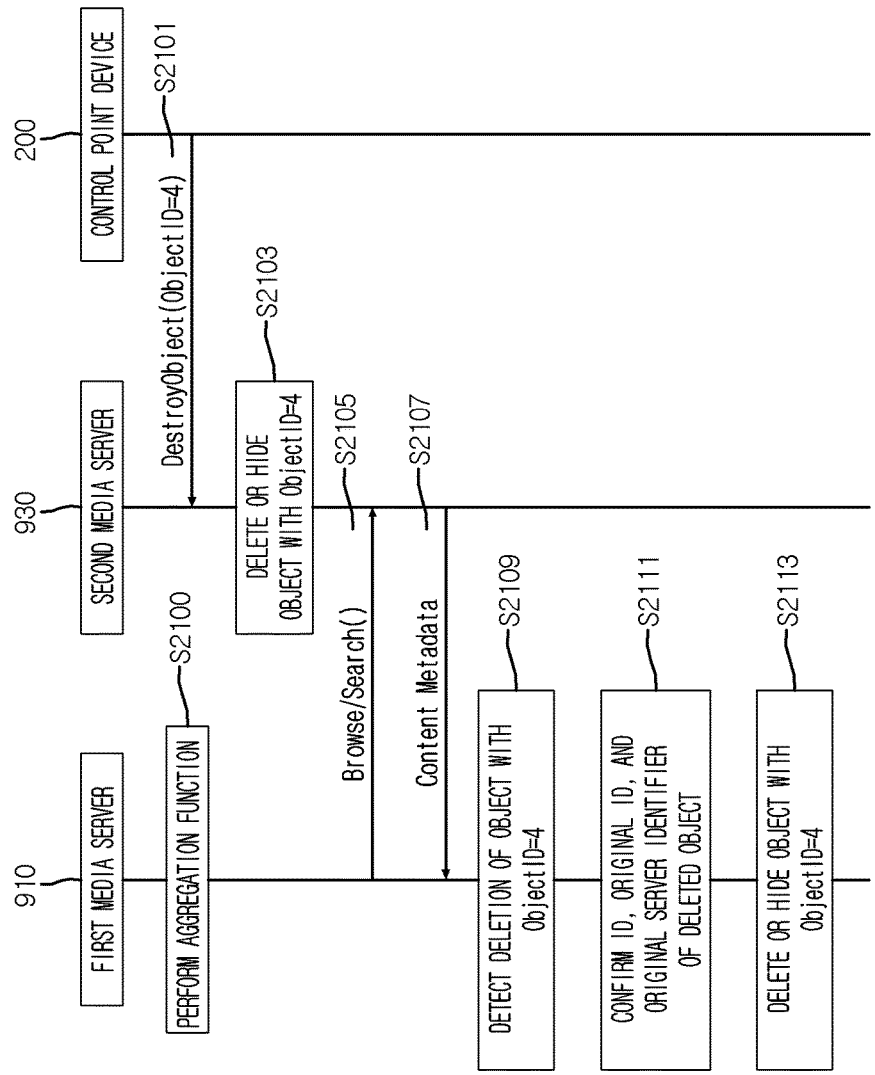
FIG. 17 is a flowchart illustrating a process of an AMS to reflect an update situation of content metadata executed on an ADMS according to an embodiment of the present invention.

FIG. 17 is a flowchart illustrating a process of an AMS to reflect an update situation of content metadata executed on an ADMS according to an embodiment of the present invention.

Referring to FIG. 17, the first media server 910, as an AMS, performs a content metadata aggregation function on the content stored in the second media server 930 in operation S2100.

Then, the control point device 200 transmits an object destroy command (DestroyObject) to the second media server 930 in operation S2101. The DestroyObject may specify an object. For example, the control point device 200 may specify an object having the object ID of '4' and then may transmit DestroyObject to the second media server 930.

In response to the transmitted DestroyObject, the second media server 930 deletes or hides an object having the object ID of '4' in operation S2103. For example, the second media server 930 may delete an object having the object ID of '4' or stops exposing an object of having the object ID of '4' to the control point device 400 or an AMS.

Then, the first media server 910, as an AMS, transmits a browse/search request (Browse/Search( )) to the second media server 930 in operation S2105, and the second media server 930 transmits the remaining content metadata except for an object having the object ID of '4' to the first media server 910 in operation S2107.

The first media server 910 receives content metadata transmitted from the second media server 930, and detects that an object having the object ID of '4' is detected in operation S2109.

Then, the first media server 910 confirms the ID, original ID, and original server identifier of the deleted object in operation S2111. The ID of a deleted object may mean an object ID, which is an identifier that the first media server 910, i.e. the above-described AMS, assigns newly. Additionally, the original ID of a deleted object may mean an aggregated object ID, which is an original identifier assigned by the second media server 930. Additionally, the original server identifier of a deleted object, as the identifier of the second media server 930 (which was stored before an object is collected), may mean an original server UDN.

Once the deleted object is confirmed, the first media server 910 deletes or hides the confirmed object, i.e. an object having the object ID of '4' in operation S2113. In such a way, while performing an aggregation function continuously, when update of content metadata is executed on an ADMS, an AMS may reflect this.

Hereinafter, referring to FIGS. 18 to 30, various embodiments, in which aggregate object information collected and stored in an AMS is changed or refreshed according to a request of a control point device, will be described. Hereinafter, the same part described above will be briefly described or omitted.

Figure 18:
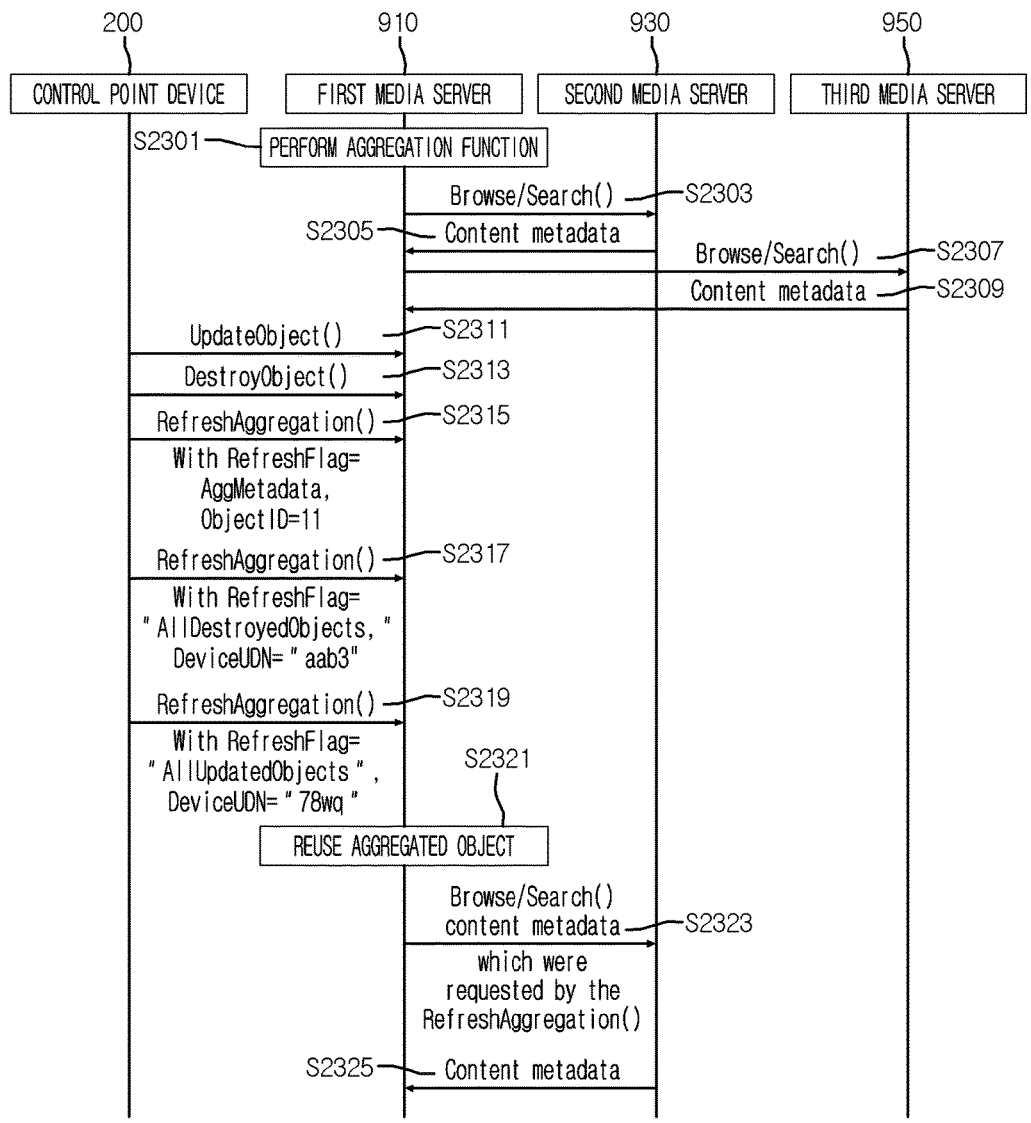
FIG. 18 is a flowchart illustrating a process of changing aggregation object information on an AMS according to an embodiment of the present invention.

FIG. 18 is a flowchart illustrating a process of changing aggregate object information on an AMS according to an embodiment of the present invention.

Referring to FIG. 18, the first media server 910, as an AMS, performs an aggregation function in operation S2301. When the first media server 910 transmits a browse/search request (Browse/Search( )) to each of the second media server 930 and the third media server 950 in operations S2303 and S2307, each of the second media server 930 and the third media server 950 transmits content metadata to the first media server 910 in operations S2305 and S2309.

Hereinafter, referring to FIG. 19, information on the aggregate object that the first media server 910 collects will be described.

FIG. 19 is a table illustrating aggregate object information on an AMS according to an embodiment of the present invention.

Referring to FIG. 19, an information property (metadata type) may represent an aggregate object on an AMS. An objectID may indicate an identifier assigned by an AMS. An aggregatedObjectID may indicate an identifier assigned by an original media server, and an OriginalServerUDN may mean a unique identifier indicating an original media server. A title may mean the title of corresponding title, and a creator may mean the name of a subject that creates corresponding content but they are not limited thereto. Through information shown in the table of FIG. 19, a plurality of content metadata on an AMS may be distinguished from each other.

Again, FIG. 18 will be described.

A control point device 200 transmits an object update action (UpdateObject( )) to the first media server 310 in operation S2311. Then, the first media server 910 reuses an aggregate object in operation S2321. For example, when an update item is found in response to the transmitted UpdateObject( ), the first media server 910 may update corresponding content object information as shown in FIG. 20.

FIG. 20 is a table illustrating aggregate object information updated on an AMS according to an embodiment of the present invention.

Referring to FIG. 20, according to the UpdateObject( ) transmitted from the control point device 200, the first media server 910 may update title information on the content object (ObjectID=11) having the object ID of '11' and the content object (ObjectID=18) having the object ID of '18', and creator information on the content object (ObjectID=16) having the object ID of '16'.

Again, FIG. 18 will be described.

A control point device 200 transmits an object destroy action (DestroyObject( )) to the first media server 910 in operation S2313. Then, the first media server 910 reuses an aggregate object in operation S2321. For example, when a destroy item is found in response to the transmitted DestroyObject( ), the first media server 910 may delete corresponding content object information as shown in FIG. 20.

FIG. 21 is a table illustrating aggregate object information destroyed on an AMS according to an embodiment of the present invention.

Referring to FIG. 21, according to the DestroyObject( ) transmitted from the control point device 200, the first media server 910 may delete information on the content object (ObjectID=12) having the object ID of '12' and the content object (ObjectID=14) having the object ID of '14'.

In such a way, according to the implementation of a media server or the request of a control device, there may be a difference between an aggregate object on an AMS and an original aggregated object before collection. However, even if the difference is made by a user's intention like the request of a control device, a user may cancel the difference in order to synchronize the aggregate object with the original aggregated object. Hereinafter, in order to synchronize the aggregate object with the original aggregated object, available properties such as an action and a state variable will be described.

Again, FIG. 18 will be described.

Then, the control point device 200 transmits to the first media server 910 a refresh flag (RefreshFlag=AggMetadata), i.e. 'aggregate metadata' and an aggregation refresh action (RefreshAggregation( )) including the content object (ObjectID=11) having the object ID of '11' in operation S2315. Then, the first media server 910 reuses an aggregate object in operation S2321. For example, in response to the transmitted RefreshAggregation( ), as shown in FIG. 22, the first media server 910 may refresh corresponding content object information. A Refresh Flag having the value of 'AggMetadata' may indicate a request for collecting only an aggregated object specified by an ObjectID argument.

A method of refreshing aggregate objects like operation S2315 is to specify the object ID of an aggregate object on an AMS. At this point, this does not specify an original aggregated object on an ADMS. Accordingly, the control point device 200 may refresh an aggregate object by using information other than information on an object ID and a DeviceUND among object information. At this point, when a value of a refresh flag is an AggMetadata, an AggDirectChilren, or an AggSubtree, the ObjectID, as an aggregate object identifier of an original aggregated object, needs to be collected again and updated. The ObjectID having the value of '0' corresponding to the root object of the aggregated CDS may be specified by a DeviceUDN argument. Additionally, an AMS is already known information from metadata of an object, and thus, its DeviceUDN is not necessary.

FIG. 22 is a table illustrating the case that specific aggregate object information on an AMS is refreshed according to an embodiment of the present invention.

Referring to FIG. 22, according to the RefreshAggregation( )transmitted from the control point device 200, the first media server 910 may restore deleted title information on the content object (ObjectID=11) having the object ID of '11'.

Again, FIG. 18 will be described.

The control point device 200 transmits to the first media server 910 an aggregation refresh action (RefreshAggregation( )) including a refresh flag of 'destroyed object all' (RefreshFlag=AllDestroyedObjects) and the UDN having the value of 'aab3' (DeviceUDN=aab3) in operation S2317. Then, the first media server 910 reuses an aggregate object in operation S2321. For example, in response to the transmitted RefreshAggregation( ), as shown in FIG. 23, the first media server 910 may refresh corresponding content object information. A Refresh Flag having the value of 'AllDestroyedObjects' may indicate a request for collecting all aggregate objects deleted by the DestroyObject( ). At this point, the all deleted aggregation objects may mean an original aggregated object that belongs to the ADMS specified by the DeviceUDN argument.

FIG. 23 is a table illustrating the case that all aggregate object information destroyed on an AMS is refreshed according to an embodiment of the present invention.

Referring to FIG. 23, according to the RefreshAggregation( ) transmitted from the control point device 200, the first media server 910 may restore deleted information on the content object whose originalServerUDN is 'aab3'.

Again, FIG. 18 will be described.

The control point device 200 transmits to the first media server 910 an aggregation refresh action (RefreshAggregation( )) including a refresh flag of 'updated object all' (RefreshFlag=AllUpdatedObjects) and the UDN having the value of '78wq' (DeviceUDN=78wq) in operation S2319. Then, the first media server 910 reuses an aggregate object in operation S2321. For example, in response to the transmitted RefreshAggregation( ), as shown in FIG. 24, the first media server 910 may refresh corresponding content object information. A Refresh Flag having the value of 'AllUpdatedObjects' may indicate a request for collecting all aggregate objects updated by the UpdateObject( ). At this point, the all updated aggregation objects may mean an original aggregated object that belongs to the ADMS specified by the DeviceUDN argument.

FIG. 24 is a table illustrating the case that all aggregate object information updated on an AMS is refreshed according to an embodiment of the present invention.

Referring to FIG. 24, according to the RefreshAggregation( ) transmitted from the control point device 200, the first media server 910 may restore updated information on the content object whose originalServerUDN is '78wq' into information before updating.

As mentioned above, a user may change information on an aggregate object stored in an AMS by using the control point device 200. For example, information on an aggregate object may be destroyed or updated, changes such as destruction and updating may be restored into previous ones. For this, an object change command that the control point device 200 transmits to an AMS may include various forms of actions. For example, besides the above described UpdateObject( ) DestroyObjectQ( ), and RefreshAggregation( ), the action may include RefreshDestroyObject( ) and RefreshUpdateObject( ) and is not limited thereto.

The RefreshDestroyObject( ) may means a command for restoring all objects destroyed on an AMS. An AMS receiving a destroy object refresh action (RefreshDestroyObject( )) collects original aggregated objects and generates again the deleted aggregate objects, but is not limited thereto.

The RefreshUpdateObject( ) may mean a command for restoring a specific object updated on an AMS. An AMS receiving a update object refresh action (RefreshUpdateObject( )) collects an original aggregated object and synchronizes corresponding original objects with specific aggregate objects, but is not limited thereto. The argument of the RefreshUpdateObject( ) may include a name, a direction, and a related state variable but is not limited thereto. The name of an argument may be an ObjectID, the direction may be IN, and the related state variable may be A_ARG_TY- PE_ObjectID. An action whose ObjectID argument value is set with "*" may mean a command for restoring all updated objects.

Additionally, an argument in the RefreshAggregation( ) may include a Refresh Flag and an ObjectID. Moreover, besides AggMetadata, AllDestroyedObjects, and AllUpdatedObjects, the Refresh Flag may include refresh deletion, refresh modification, All, AggDirectChildren, AggSubtree, DeviceUDN, Result, NumberReturned, and TotalMatches, but is not limited thereto.

When a value of a Refresh Flag is refresh deletion, a corresponding action may be a command for restoring all objects destroyed in an AMS. Accordingly, when receiving an action whose Refresh Flag value is refresh deletion, an AMS collects an original aggregated object and generates again the deleted aggregate objects, but is not limited thereto. Then, an argument value of ObjectID may become empty.

When a value of a Refresh Flag is refresh modification, a corresponding action may be a command for restoring a specific object updated in an AMS. Accordingly, when receiving an action whose Refresh Flag value is refresh deletion, an AMS again collects an original aggregated object and synchronizes aggregate objects with original objects, but is not limited thereto. Then, an argument value of ObjectID may become empty. An action whose ObjectID argument value is set with "*" may mean a command for restoring all updated objects.

A Refresh Flag having the value of 'All' may indicate a request for collecting all objects of an ADMS specified by a DeviceUDN argument.

A Refresh Flag having the value of 'AggDirectChildren' may indicate a request for collecting a direct children object of an aggregated object specified by an ObjectID argument. For this value, the ObjectID argument needs to indicate a container class object.

A Refresh Flag having the value of 'AggSubtree' may indicate a request for collecting all derivative objects such as a subtree of an aggregated object specified by an ObjectID argument. For this value, the ObjectID argument needs to indicate a container class object.

Thus, the ObjectID, as an object identifier (@id of the object), needs to be collected again and updated when a value of a refresh flag is AggMetadata, AggDirectChildren, and AggSubtree. The ObjectID having the value of '0' corresponding to the root object of the aggregated CDS may be specified by a DeviceUDN argument.

Additionally, the DeviceUDN of an ADMS device whose objects are updated or refreshed may be included in a fresh flag whose value is All, AllDestroyedObjects, or AllUpdatedObjects. The DeviceUDN having the value of '0' corresponding to an ADMS of an AMS may be identical to value of an aggregated list state variable.

Besides the above-described Refresh Flag and ObjectID, the argument of RefreshAggregation( ) may include a 'UDN (DeviceUDN)' argument, a 'Result' argument, a 'NumberReturned' argument, and a 'TotalMatches' argument, but is not limited thereto. The name of the 'DeviceUDN' argument may be DeviceUDN, its direction may be "IN", and its related state variable may be A_ARG_TYPE_DeviceUDN. The name of the 'Result' argument may be Result, its direction may be "OUT", and its related state variable may be A_ARG_TYPE_Result. The name of the 'NumberReturned' argument may be NumberReturned, its direction may be "OUT", and its related state variable may be A_ARG_TYPE_Count. The name of the 'TotalMatches' argument may be TotalMatches, its direction may be "OUT", and its related state variable may be A_ARG_TYPE_Count.

Again, FIG. 18 will be described.

The first media server 910 requests specific content metadata to the second media server 930 in operation S2323 in response to the RefreshAggregation( ) transmitted from a control point device. Then, the second media server 930 transmits the requested content metadata to the first media server 910 in operation S2325. Although not shown in the drawings, the first media server 910 collects specific content metadata from the third media server 950 in such a way.

Hereinafter, referring to FIG. 25, a method of an AMS to change aggregate object information by using a Refresh Flag having the value of 'All' will be described. Hereinafter, only a difference with respect to a portion described with reference to FIG. 18 will be described.

Figure 25:
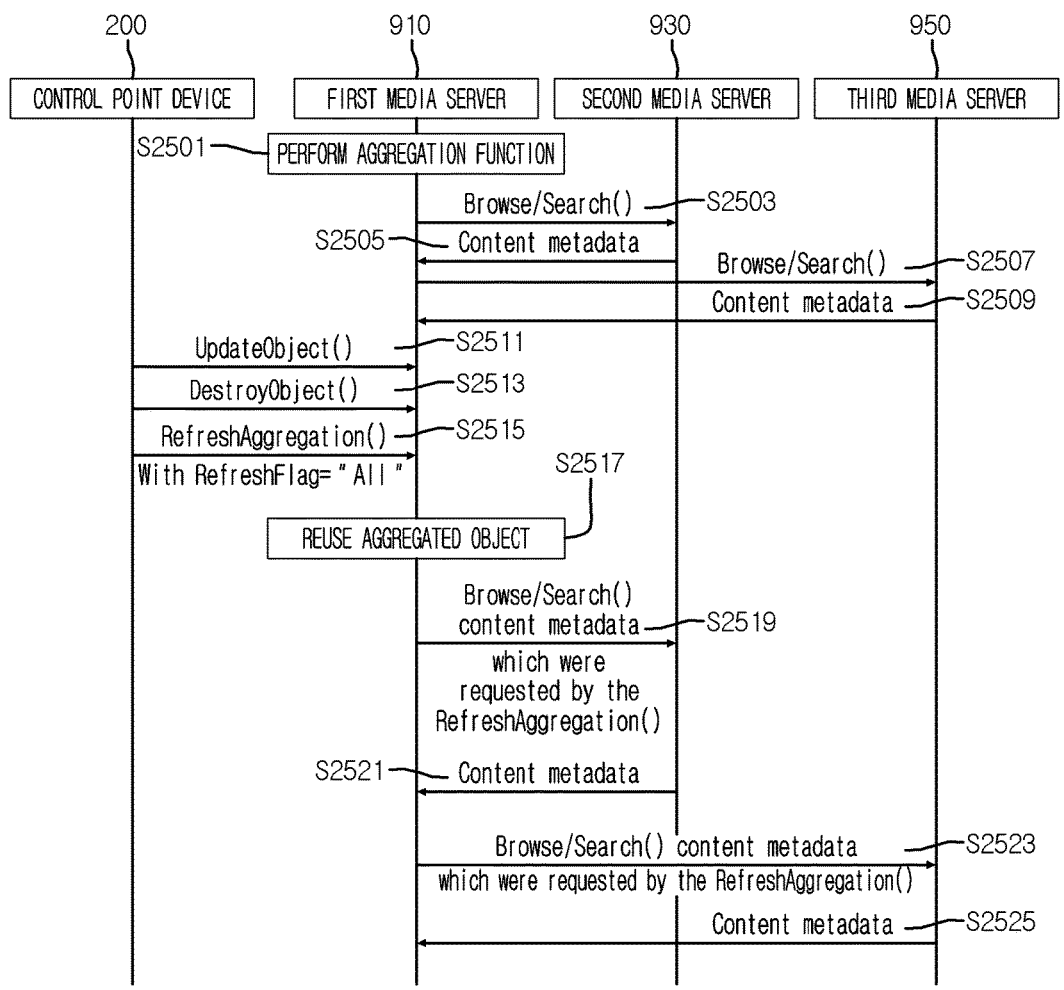
FIG. 25 is a flowchart illustrating a process of changing aggregation object information on an AMS according to another embodiment of the present invention.

FIG. 25 is a flowchart illustrating a process of changing aggregation object information on an AMS according to another embodiment of the present invention.

Referring to FIG. 25, the first media server 910 reuses objects in operation S2517, which are aggregated in operations S2501 to S2513. As a result, the content object collected and stored in the first media server 910 may include information such as the table shown in FIG. 21.

Then, the control point device 200 transmits to the first media server 910 a RefreshAggregation( ) which includes a refresh flag (Refresh Flag=All) having the value of 'all metadata' in operation S2515.

Accordingly, the first media server 910 transmits a Browse/Search( ) corresponding to a RefreshAggregation( ) to each of the second media server 930 and the third media server 950 in operations S2519 and S2523, and collects all content metadata from each of the second media server 930 and the third media server 950 in operations S2521 and S2525.

That is, the first media server 910 may refresh the same information as the table information shown in FIG. 24 in response to the RefreshAggregation( ), which includes a refresh flag (Refresh Flag=All) having the value of 'all metadata'.

Figure 26:
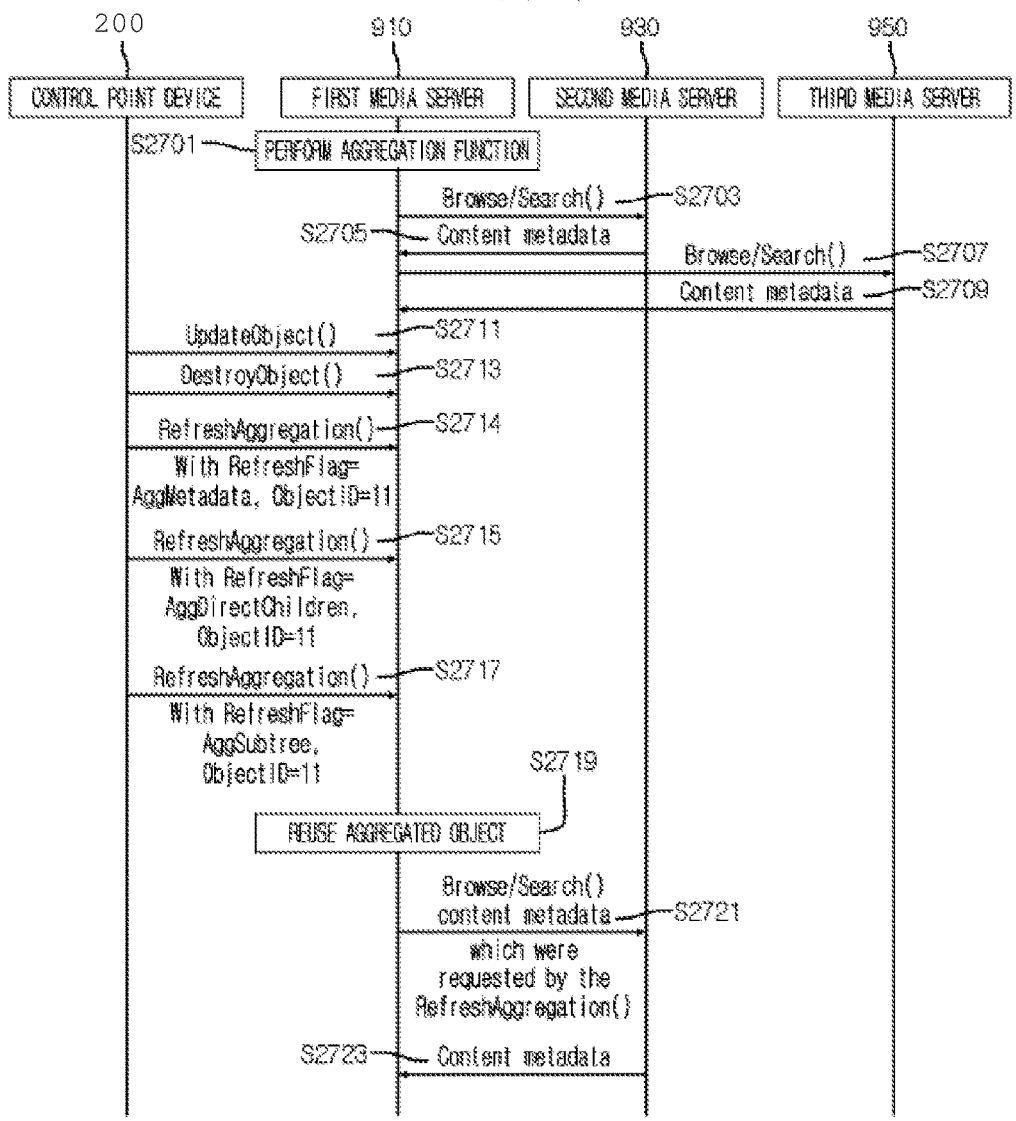
FIG. 26 is a flowchart illustrating a process of changing aggregation object information on an AMS according to another embodiment of the present invention.

FIG. 26 is a flowchart illustrating a process of changing aggregation object information on an AMS according to another embodiment of the present invention.

Referring to FIG. 26, the first media server 910 performs an aggregation function in operation S2701. The first media server 910 collects the content metadata of the second media server 930 and the third media server 950 in operations S2703 to S2709. Information on the aggregate object that the first media server 910 collects may be stored as shown in the table information of FIG. 19.

Then, the control point device 200 transmits a UpdateObject( ) to the first media server 910 in operation S2711 and the first media server 910 reuses an aggregate object in response to the UpdateObject( ) in operation S2719. When an update item is found in response to the transmitted UpdateObject( ), the first media server 910 may update corresponding content object information as shown in FIG. 27.

FIG. 27 is a table illustrating aggregate object information updated on an AMS according to another embodiment of the present invention.

Referring to FIG. 27, according to the UpdateObject( ) transmitted from the control point device 200, the first media server 910 may update creator information on the content object (ObjectID=13) having the object ID of '13', the content object (ObjectID=16) having the object ID of '16', and the content object (ObjectID=18) having the object ID of '18'.

Again, FIG. 26 will be described.

Then, when the control point device 200 transmits a DestroyObject( ) to the first media server 910 in operation S2713, the first media server 910 reuses an aggregate object in response to the DestroyObject( ) in operation S2719. When a destroy item is found in response to the transmitted DestroyObject( ), the first media server 910 may delete corresponding content object information as shown in FIG. 28.

FIG. 28 is a table illustrating aggregate object information destroyed on an AMS according to another embodiment of the present invention.

Referring to FIG. 28, according to the UpdateObject( ) transmitted from the control point device 200, the first media server 910 may delete information on the content object having the object ID of '14'.

Again, FIG. 26 will be described.

The control point device 200 transmits to the first media server 910 a refresh flag (RefreshFlag=AggMetadata) having a 'aggregate metadata' value and an aggregation refresh action (RefreshAggregation( ))including the content object (ObjectID=11) having the object ID of '11' in operation S2714, and the first media server 910 reuses an aggregate object in operation S2719. For example, the first media server 910 may reuse an aggregate object according to the RefreshAggregation( ). In response to the transmitted RefreshAggregation( ), as shown in FIG. 29, the first media server 910 may refresh information on the aggregated object having the ObjectID of '11'. The first media server 910 transmits a Browse/Search( )corresponding to a RefreshAggregation( )to the second media server 930 in operations S2721, and collects content metadata from the second media server 930 in operations S2723.

FIG. 29 is a table illustrating the case that specific aggregate object information on an AMS is refreshed according to another embodiment of the present invention.

Referring to FIG. 29, according to the RefreshAggregation( )transmitted from the control point device 200, the first media server 910 may refresh information on a content object having the object ID of '11' into information on an original object before the content object is changed due to updating or deleting.

Again, FIG. 26 will be described.

The control point device 200 transmits to the first media server 910 a RefreshAggregation( ), which includes a refresh flag (RefreshFlag=AggDirectChildren) having a "aggregate direction children' value and the object ID (ObjectID=11) having the value of '11' in operation S2715, and then, the first media server 910 reuses an aggregate object in response to the RefreshAggregation( ) in operation S2719. In response to the transmitted RefreshAggregation( ), as shown in FIG. 30, the first media server 910 may refresh information on the direct children object of the aggregated object having the ObjectID of '11'.

FIG. 30 is a table illustrating the case that specific aggregate object information on an AMS is refreshed according to another embodiment of the present invention.

Referring to FIG. 30, according to the RefreshAggregation( ) transmitted from the control point device 200, the first media server 910 may refresh information on a direct children object of the content object having the object ID of '11' (for example, information on the content object having the object ID of '13' and the content object having the object ID of '14') into original object information before the direct children object is updated or deleted.

Again, FIG. 26 will be described.

The control point device 200 transmits to the first media server 910 a RefreshAggregation( ) including a refresh flag (RefreshFlag=AggSubtree) having a 'aggregate subtree' value and an object ID (ObjectID=11) having the value of '11' in operation S2717, and the first media server 910 reuses an aggregate object in response to RefreshAggregation( ) in operation S2719. In response to the transmitted RefreshAggregation( ), as shown in FIG. 31, the first media server 910 may refresh all information on a derivative object such as a subtree of an aggregated object having the ObjectID of '11'.

FIG. 31 is a table illustrating the case that specific aggregate object information on an AMS is refreshed according to another embodiment of the present invention.

Referring to FIG. 31, according to the RefreshAggregation( )transmitted from the control point device 200, the first media server 910 may refresh information on a subtree object of the content object having the object ID of '11' (for example, information on the content object having the object ID of '16' and the content object having the object ID of '18') into original object information before the subtree object is updated.

As described above, when an error occurs during an aggregation refresh process, three major error codes may occur. The error code may include 701, 720, and 742, but is not limited thereto.

The error code 701 indicates "No such object" and that a specified ObjectID argument is not valid. Thus, it may mean that the RefreshAggregation( ) is failed.

The error code 720 indicates "Cannot process the request", and may mean that a content directory service cannot calculate the total number of objects matching a refresh reference in the time allotted, and cannot additionally return objects matching a corresponding refresh reference.

The error code 742 indicates "Unsupported action" and means that a RefreshAggregation( ) is supported only when a value of an aggregation mode state variable is '1'. However, when a value of a current state variable is '0', a requested action may not be supported.

Hereinafter, referring to FIG. 32, information on an ADMS stored in an AMS according to an embodiment of the present invention will be described.

FIG. 32 is a view illustrating ADMS related information of an XML type stored in an AMS according to an embodiment of the present invention.

A control device may need to obtain information on each of a plurality of ADMSs through an AMS, for example, a list, power states, aggregation criteria, and an aggregation process. In order to control more detailed information on an ADMS, the control device may control whether an aggregation media device collects a content object from which media server, a power state in each ADMS, and a type of a content object that an aggregation media device is to collect.

Hereinafter, an action and a state variable for obtaining or setting more information on each of a plurality of ADMSs through an AMS will be described.

An AMS may store ADMS information through a state variable. Aspects of such a state variable may include a name, a data type, and a data format. The name of the state variable may be an AggregationStatus, the data type may be an XML fragment, and the data format may include a plurality of elements and a plurality of attributes. The data format may be suggested as a format shown in FIG. 32.

In order to control such ADMS information, an AMS may use a GetAggregationStatus( ) and a SetAggregationStatus( ).

The name of the GetAggregationStatus ( ) is a GetAggregationStatus, and may define an argument including a name, a direction, and a related state variable. The name of the argument is a CurrentAggregationStatus, its direction is "OUT", and its related status variable is an AggregationStatus. An AMS may obtain information on a current aggregation status of an ADMS through the GetAggregationStatus( ).

The name of the SetAggregationStatus ( ) is a SetAggregationStatus, and may define an argument including a name, a direction, and a related state variable. The name of the argument is a NewAggregationStatus, its direction is "IN", and its related status variable is an AggregationStatus. An AMS may newly set an aggregation status of an ADMS through the SetAggregationStatus( ).

Moreover, the control device operates an AMS instead of ADMS, so that it needs to delete or edit an original aggregated object on the ADMS. For this, the control device may redirect a request message to an ADMS, which will be described with reference to FIGS. 33 to 36.

Figure 33:
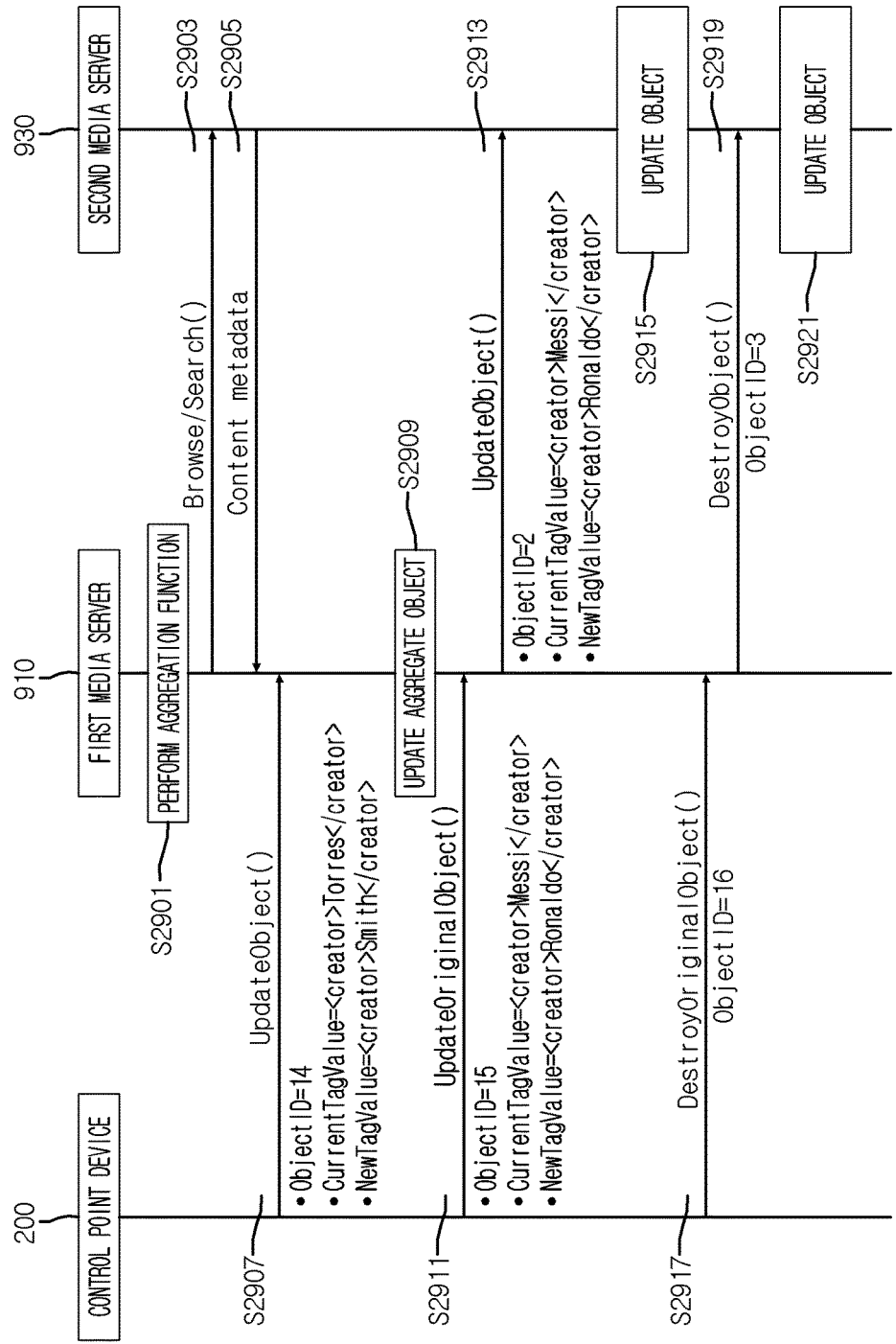
FIG. 33 is a flowchart illustrating a method of changing a content object in an ADMS by redirecting to the ADMS the request that an AMS receives from a control point device according to an embodiment of the present invention.

FIG. 33 is a flowchart illustrating a method of changing a content object in an ADMS by redirecting to the ADMS the request that an AMS receives from a control point device according to an embodiment of the present invention.

Additionally, FIGS. 34 to 37 are tables representing information stored on an AMS and an ADMS when the AMS transmits a request from a control point device to the ADMS according to an embodiment of the present invention.

Referring to FIG. 33, the first media server 910, as an AMS, performs an aggregation function in operation S2901, transmits a browse/search request (Browse/Search( )) to the second media server 930 in operation S2903, and receives content metadata from the second media server 930 in operation S2905. The first media server 910, as shown in FIG. 34, may store the content metadata collected from the second media server 930. Referring to FIG. 34, the first media server 910 may store various kinds of information on an aggregated object ID (aggregatedObjectID) of a content object assigned by the second media server 930, an object ID (ObjectID) of a content object that the second media server 910 newly assigns, an original server UDN (originalServerUDN) corresponding to the UDN(aab3) of the second media server 930, a parent ID (parentID) of each content object, and a creator of each content object.

Again, FIG. 33 will be described.

The control point device 200 transmits an Update Object( ) to the first media server 910, i.e. an AMS, in operation S2907. At this point, the UpdateObject( ) may include an object ID having the value of '14' (ObjectID=14), a current tag value of creator information having the value of (CurrentTagValue=<creator>Torres</creator>), and a new tag value of creator information (NewTagValue=<creator>Smith</creator>).

Referring to FIG. 33, in response to the UpdateObject( ) transmitted from the control point device 200, the first media server 910 may update aggregate object information on the content object in operation S2909. That is, according to a control of the control point device 200, the first media server 910 may edit the content object information stored in the first media server 910. That is, the first media server 910 may update the creator information of 'Torres' of the object ID of '14'(ObjectID=14) with 'Smith'.

Again, FIG. 33 will be described.

Then, the control point device 200 transmits an UpdateOriginalObject( ) to the first media server 310 to the first media server 910 in operation S2911. The UpdateOriginalObject( ) may include various kinds of argument information. The argument may include a name, a direction, and a related state variable. The name of an argument may be an ObjectID, its direction may be IN, and its related state variable may be an A_ARG_TYPE_ObjectID. The name of an argument may be a CurrentTagValue, its direction may be IN, and its related state variable may be an A_ARG_TYPE_TagValueList. Additionally, the name of an argument may be a NewTagValue, its direction may be IN, and its related state variable may be an A_ARG_TYPE_TagValueList. Additionally, the name of an argument may be an AggregatedCDSID, its direction may be IN, and its related state variable may be an A_ARG_TYPE_UDN or an AggregatedDeviceList. The AggregatedCDSID may mean the UDN of an original aggregated server.

For example, a value of the UpdateOriginalObject( ) may include an object ID having the value of '15' (ObjectID=15), a current tag value of creator information having the value of 'Messi' (CurrentTagValue=<creator>Messi</creator>), and a new tag value of creator information having the value of 'Ronaldo' (NewTagValue=<creator>Ronaldo</creator>).

Then, the first media server 910 transmits an OriginalObject( ) to the second media server 930 in operation S2913. At this point, a value of the UpdateObject ( ) may include an object ID having the value of '2' (ObjectID=2), a current tag value of creator information having the value of 'Messi' (CurrentTagValue=<creator>Messi</creator>), and a new tag value of creator information having the value of 'Ronaldo' (NewTagValue=<creator>Ronaldo</creator>).

Referring to FIG. 36, in response to the UpdateObject( ) transmitted from the first media server 910, the second media server 930 may update object information in operation S2915. That is, according to a control of the control point device 200, the second media server 930 may edit the content object information stored in the second media server 930. That is, the second media server 930 may update the creator information of 'Messi' of the object ID of '2' (ObjectID=2) with 'Ronaldo'. That is, since the first media server 910 redirects the action from the control point device 200 to the second media server 930, it may edit information in the second media server 930.

Again, FIG. 33 will be described.

Then, the control point device 200 transmits a DestroyOriginalObject( ) to the first media server 310 in operation S2917. At this point, a value of the DestroyOriginalObject( ) may include information on the object ID having the value of '16' (ObjectID=16).

Then, the first media server 910 transmits a DestroyObject( ) to the second media server 930 in operation S2919. At this point, a value of the DestroyObject( ) may include information on the object ID having the value of '3' (ObjectID=3).

Referring to FIG. 37, in response to the Destroy Object( )transmitted from the first media server 910, the second media server 930 may update object information in operation S2921. That is, according to a control of the control point device 200, the second media server 930 may delete the content object information stored in the second media server 930. That is, the second media server 930 may delete information corresponding to an object ID of '3' (ObjectID=3). That is, since the first media server 910 redirects the action from the control point device 200 to the second media server 930, it may edit information in the second media server 930.

According to an embodiment of the present invention, an aggregation server that collects information stored in another server among a plurality of servers belonging to the same network may be set.

The various embodiments described herein may be realized in a computer or similar device thereto readable recording medium through software, hardware, or a combination thereof.

According to the hardware realization, the embodiments described herein may be realized using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units for performing other functions. In some cases, the embodiments may be realized by the control unit.

According to the software realization, the embodiments relating to procedures or functions may be realized with an additional software module for performing at least one function or operation. A software code may be realized with a software application written in a proper program language. The software code is stored in the memory and is executed by the control unit.

According to an embodiment of the present invention, the above method may be realized with codes that a processor can read in a program recorded medium. Examples of the computer readable recording medium include read-only memory (ROM), random-access memory (RAM), CD-ROMs, magnetic tapes, floppy disks, and optical data storage devices, and further includes a carrier wave form (such as data transmission through the Internet).

The above described devices are not limited to the configurations and methods of the above embodiments, and all or some of the above embodiments are selectively combined in order to provide various modified embodiments.

What is claimed is:

1. A method of controlling an aggregate server, the method comprising:
   collecting, by the aggregate server, content information stored in an aggregated device;
   transmitting, by a control device, a content information change request signal to the aggegate server,
   wherein the content information change request signal is an update action or a destroy action;
   updating or deleting, by the aggregate server, the collected content information based on the content information change request signal;
   transmitting, by the control device, an aggregation refresh action to the aggregate server,
   refreshing, by the aggregate server, the collected content information,
   wherein the refreshing step synchronizes only the collected content information identified by the aggregation refresh action,
   wherein the aggregation refresh action includes a refresh flag specifying which of the collected content information will be aggregated again, and
   wherein the refresh flag corresponds to one of:
      a first value indicating that the collected content information will be synchronized again to include results of the update action and the destroy action,
      a second value indicating that the collected content information will be synchronized again to include a result of the update action and not include a result of the destroy action, or
      a third value indicating that the collected content information will be synchronized again to not include results of the update action or the destroy action.

2. The method of claim 1, wherein when an error occurs during an aggregation refresh process, the error includes an error code indicating that there is no corresponding object.

3. An aggregate server comprising:
   a controller processor that:
      collects content information stored in an aggregated device,
      receives a content information change request signal,
      wherein the content information change request signal is an update action or a destroy action,
      updates of deletes the collected content information based on the content information change request signal,
      receives an aggregation refresh action,
      refreshes the collected content information,
      wherein the refresh synchronizes only the collected content information identified by the aggregation refresh action,
      wherein the aggregation refresh action includes a refresh flag specifying which of the collected content information will be aggregated again, and
      wherein the refresh flag corresponds to one of:
         a first value indicating that the collected content information will be synchronized again to include results of the update action and the destroy action,
         a second value indicating that the collected content information will be synchronized again to include a result of the update action and not include a result of the destroy action, or
         a third value indicating that the collected content information will be synchronized again to not include results of the update action or the destroy action.

4. The server of claim 3, wherein when an error occurs during an aggregation refresh process, the error includes an error code indicating that there is no corresponding object.

* * * * *